US009550336B2

(12) United States Patent
Bradford

(10) Patent No.: US 9,550,336 B2
(45) Date of Patent: Jan. 24, 2017

(54) METHOD OF MAKING SANDWICH-LIKE PRODUCT STARTING WITH EXTRUDED PROFILE

(71) Applicant: Bradford Company, Holland, MI (US)

(72) Inventor: Judson A. Bradford, Holland, MI (US)

(73) Assignee: Bradford Company, Holland, MI (US)

( * ) Notice: Subject to any disclaimer, the term of this patent is extended or adjusted under 35 U.S.C. 154(b) by 493 days.

(21) Appl. No.: 14/179,168

(22) Filed: Feb. 12, 2014

(65) Prior Publication Data

US 2014/0158289 A1 Jun. 12, 2014

Related U.S. Application Data

(63) Continuation of application No. 13/345,166, filed on Jan. 6, 2012, now Pat. No. 8,668,855, which is a (Continued)

(51) Int. Cl.
*B29C 47/00* (2006.01)
*B29C 53/24* (2006.01)
(Continued)

(52) U.S. Cl.
CPC ........... *B29D 24/001* (2013.01); *B29C 47/003* (2013.01); *B29C 47/0028* (2013.01); *B29C 47/12* (2013.01);
(Continued)

(58) Field of Classification Search
CPC ..... B29D 24/001; B29D 99/0089; B31D 3/02; B29C 47/12; B29C 53/063; B29C 47/0028; B29C 47/0059; B29C 47/0066; B29C 47/0064; B29C 53/06; B29C 53/02; B29C 53/04; B29C 53/22–53/285; B29C 53/36; B29C 53/38; Y10T 428/236; Y10T 428/24165; Y10T 428/24149; Y10T 156/1003; B32B 3/12; B32B 27/06; B32B 27/08; B32B 2307/58; B32B 2307/718; B32B 2605/18; B32B 2307/50; B30B 15/062
See application file for complete search history.

(56) References Cited

U.S. PATENT DOCUMENTS 1,886,830 A 11/1932 Murray, Jr.
2,477,852 A * 8/1949 Bacon ........................ E04C 2/36
156/189

(Continued)

FOREIGN PATENT DOCUMENTS

DE 19716637 10/1998
FR 1509018 1/1968
(Continued)

OTHER PUBLICATIONS

Project Page, "Composite Materials Group", K.U. Leuven Dept. MTM, Maschinenfabrik Meyer (no date), 1 page.
(Continued)

*Primary Examiner* — Jeffrey Wollschlager
(74) *Attorney, Agent, or Firm* — Wood, Herron & Evans, LLP

(57) ABSTRACT

A product made from an extruded sheet or web of material having a non-linear cross-section, and the process of making the product are provided. The extruded web or extrudate is plastically deformed in selected areas and then folded. When folded into the appropriate shape, the extrudate is formed into a product having a plurality of cells. The cells may have one or more openings, allowing access to an interior of the cell and reducing the weight of the product.

24 Claims, 33 Drawing Sheets

Related U.S. Application Data continuation-in-part of application No. 11/566,973, filed on Dec. 5, 2006, now abandoned.

(51) Int. Cl.
| | |
|---|---|
| *B29C 47/06* | (2006.01) |
| *B29C 53/02* | (2006.01) |
| *B29D 24/00* | (2006.01) |
| *B29C 47/12* | (2006.01) |
| *B29C 53/06* | (2006.01) |
| *B29D 99/00* | (2010.01) |
| *B31D 3/02* | (2006.01) |
| *B29L 31/60* | (2006.01) |

(52) U.S. Cl.
CPC ......... *B29C 53/063* (2013.01); *B29D 99/0089* (2013.01); *B31D 3/02* (2013.01); *B29C 47/0059* (2013.01); *B29C 47/0064* (2013.01); *B29C 47/0066* (2013.01); *B29L 2031/60* (2013.01); *B29L 2031/608* (2013.01); *Y10T 156/1003* (2015.01); *Y10T 428/236* (2015.01); *Y10T 428/24149* (2015.01); *Y10T 428/24165* (2015.01)

(56) References Cited

U.S. PATENT DOCUMENTS

| | | | |
|---|---|---|---|
| 2,716,805 A | | 9/1955 | Reed |
| 2,956,281 A | * | 10/1960 | McMillan ............... H01Q 1/424 156/197 |
| 3,379,594 A | | 4/1968 | Bruder |
| 3,582,447 A | | 6/1971 | Stolki |
| 3,642,550 A | * | 2/1972 | Doll ................... B29C 67/2235 156/229 |
| 3,664,906 A | * | 5/1972 | Hartig ................... B29C 43/305 428/116 |
| 3,904,551 A | | 9/1975 | Lundsager et al. |
| 3,932,090 A | | 1/1976 | Brumlik |
| 3,935,357 A | * | 1/1976 | Padovani ............... B65D 11/16 206/594 |
| 4,197,341 A | | 4/1980 | Rule |
| 4,847,966 A | | 7/1989 | Kuchelmeister |
| 5,132,156 A | | 7/1992 | Trassare, Jr. et al. |
| 5,389,059 A | | 2/1995 | Corwin |
| 5,660,904 A | | 8/1997 | Andersen et al. |
| 5,965,238 A | * | 10/1999 | Saitoh ................... B29C 53/063 264/407 |
| 6,183,836 B1 | | 2/2001 | Pflug |
| 6,199,342 B1 | * | 3/2001 | Court ................... B29C 65/7433 29/897.31 |
| 6,460,724 B1 | | 10/2002 | Bradford |
| 6,720,060 B1 | | 4/2004 | Swars |
| 6,726,974 B1 | | 4/2004 | Pflug et al. |
| 6,800,351 B1 | | 10/2004 | Pflug et al. |
| 7,083,860 B2 | | 8/2006 | Maus et al. |
| 7,399,919 B2 | | 7/2008 | McCutcheon et al. |
| 7,409,976 B2 | | 8/2008 | Chevalier et al. |
| 8,454,781 B2 | | 6/2013 | Bradford |
| 2003/0215613 A1 | * | 11/2003 | Jan ...................... B29C 47/0028 428/188 |
| 2005/0263244 A1 | | 12/2005 | Henderson et al. |
| 2006/0191985 A1 | | 8/2006 | Norcom |
| 2008/0044621 A1 | * | 2/2008 | Strauss ................. B22F 3/1112 428/108 |
| 2008/0176027 A1 | * | 7/2008 | Pflug .................. B29D 99/0089 428/116 |
| 2008/0202672 A1 | * | 8/2008 | Bradford .................. E04C 2/20 156/210 |
| 2011/0244177 A1 | * | 10/2011 | Nasstrom ........... B29D 99/0089 428/116 |

FOREIGN PATENT DOCUMENTS

| | | |
|---|---|---|
| WO | 9703816 | 2/1997 |
| WO | 0032382 | 10/1999 |
| WO | 0168351 | 9/2001 |
| WO | 2006053407 | 5/2006 |

OTHER PUBLICATIONS

"Continuously Produced Honeycomb Cores", Jochen Pflug et al., K.U. Leuven Dept. MTM, (no date), 10 pages.

"Composite Materials Group", "TorHex Projects", http://www.mtm.kuleuven.ac.be/Research/C2/poly/TORHex.htm, (2004), 6 pages.

"Thermoplastic Folded Honeycomb Cores—Cost Efficient Production of All Thermoplastic Sandwich Panels", Jochen Pflug et al., K.U. Leuven, Dept. Mechanical Engineering, (no date), 8 pages.

Eureka EU 1440 Factory, "E! 2796 Factory Thermhex—New Thermoplastic Honeycomb Sandwich Core Material for Structural Applications", http://www.kp.dir.de/EUREKA/FACTORY/publications.htm, (Sep. 9, 2005), 6 pages.

"Folded Honeycomb Cardboard and Core Material for Structural Applications", Sandwich Construction 5, Jochen Pflug et al., Copyright EMAS 1999, 12 pages.

"New Sandwich Material Concepts—Continuously Produced Honeycomb Cores", Composites in Transport Network, Jochen Pflug et al., K.U. Leuven, Dept. MTM, Oct. 2, 2003, 32 pages.

"Pointed." in: Merriam-Webster.com [online], [retrieved on Jun. 26, 2013]. Retrieved from the Internet, <URL: http://www.merriam-webster.com/dictionary/pointed>.

* cited by examiner

METHOD OF MAKING SANDWICH-LIKE PRODUCT STARTING WITH EXTRUDED PROFILE

CROSS-REFERENCE TO RELATED APPLICATIONS

This application is a continuation of U.S. patent application Ser. No. 13/345,166 filed Jan. 6, 2012 entitled "Method of Making Core for Sandwich-Like Product Starting with Extruded Profile", now U.S. Pat. No. 8,668,855, which is fully incorporated by reference herein. U.S. patent application Ser. No. 13/345,166 is a continuation-in-part of U.S. patent application Ser. No. 11/566,973 filed Dec. 5, 2006 entitled "Folded Product Made From Extruded Profile and Method of Making Same", which is fully incorporated by reference herein.

FIELD OF THE INVENTION

This invention relates generally to a sandwich-like product for structural, packaging and other applications and the process of making the product.

BACKGROUND OF THE INVENTION

In the aerospace industry, honeycomb products have been used as a core component for sandwich panels and boards that are resistant to buckling and bending. These honeycomb products each comprise a plurality of cells, which in cross-section have a generally hexagonal shape. Such products may be fabricated from aluminum, fiber paper or plastic, among other materials. A sandwich structure may be prepared having two cover layers or skins which are welded, adhesively bonded or otherwise secured to the honeycomb product to create a multi-layered or multi-laminate material. Interest expressed in other industrial sectors concerning the use of lightweight sandwich structures is continually growing, due at least in part to the realization of its high strength properties while maintaining a relatively low structural weight-per-volume of product.

A multi-layered or multi-laminate material having a honeycomb product as the core thereof may be used in the packaging industry. However, in automobile part packaging and comparable markets, such a product must compete with corrugated paperboard or corrugated plastic or like materials which may be produced quickly and relatively inexpensively.

U.S. Pat. No. 6,183,836 discloses a honeycomb core for use in a sandwich material in which the material of the honeycomb core is cut and then folded to create a plurality of hexagonal cells. Due to the cuts in the sheet prior to folding the sheet, the resultant cells may be weaker than desired.

A process for producing a folded honeycomb core for use in sandwich materials from a continuous uncut web is disclosed in U.S. Pat. No. 6,726,974. U.S. Pat. No. 6,800,351 discloses another process for producing a folded honeycomb core which includes scoring a corrugated material before rotating interconnected corrugated strips. The honeycomb core resulting from using either of these methods may have material which adds to the weight of the honeycomb core, but may not significantly improve the strength of the honeycomb core.

Accordingly, there is a need for a product which may be used alone or in a multi-layered material, and which has a favorable strength-to-weight ratio.

There is further a need for a process for manufacturing a product, such as a core for use alone or in a multi-layered material, which is less expensive and may be produced in higher quantities than heretofore known processes.

SUMMARY OF THE INVENTION

These and other objectives of the invention have been attained in a process for producing a core for use alone or in a sandwich-like product. The process includes extruding a web of material which has a non-planar profile, i.e., has a non-linear cross-section, plastically deforming or treating portions of such web, and then folding the treated web to produce the core. The extrudate has a generally corrugated shape with continuous peaks and valleys joined by connecting portions, all extending in the direction of travel of the extrudate.

The process of preparing a web of material suitable for further fabrication into a product is rendered efficient in part by producing an extrudate having a non-linear cross-section. For purposes of this document, linear shall be defined as a single straight continuous line, the shortest distance between two points. Each of the extrudates or extruded webs illustrated herein has a non-planar profile and has a non-linear cross-section. Shapes of other webs of material not shown are intended to be included in such a definition. The extrudate displays a non-linear, cross-sectional configuration upon exiting the extruder head. This cross-section may assume any of a variety of shapes.

According to one aspect of this invention, a process of making a product comprises extruding a web of material having a predetermined or desired width or transverse dimension, the extruded web having a generally non-linear, cross-section; plastically deforming such as flattening areas of the extruded web; and folding the web. As defined herein, the term "web" encompasses material processed in extrusion equipment intended to accept the specific material introduced into that equipment, and issuing or exiting from an extruder head.

During any of the processes described or shown herein, a plurality of openings may be introduced into the extruded web. These openings can be introduced by stamping the material, but may also include processing of the extruded web by one or more tools to thereby form the openings. As used herein, an opening is intended to encompass the situation in which material is removed from the web. The openings may be circular, but may assume one of any number of other shapes, such as oval, hourglass, asymmetric, and the like. The process of plastically deforming or flattening selected areas of the extruded web may comprise contacting the extruded web with an element which may be heated. Selected areas of the extruded web can be flattened by a tool at any desired temperature applying pressure, heat, or a combination of pressure and heat, in one or more selected areas. The process of flattening may precede the introduction of openings into the extruded web, may follow the introduction of openings into the extruded web, or the two processes may occur substantially simultaneously.

One type of non-linear, cross-section shape which the extruded web may display is a generally corrugated shape with peaks and valleys joined by connecting portions, the peaks, valleys and connecting portions all extending in the direction of travel of the web during extrusion. The extruded web is flattened in selected areas and then folded along transversely extending fold lines on the edges of the flattened areas.

According to another aspect of the invention, a process of making a core for a sandwich-like product comprises extruding a web of material having a generally non-planar profile comprising continuous corrugations with continuous peaks and valleys joined by connecting portions extending in the direction of travel of the web. The next step in the process comprises flattening selected areas of the extruded web using at least one movable tool to interrupt the continuous corrugations to create a plurality of corrugated regions, each comprising a plurality of corrugations extending in a first direction generally parallel the direction of travel of the extruded web and a plurality of flats, each extending in a second direction perpendicular to the first direction. The next step in the process comprises folding the web along fold lines extending in the second direction. The extruded web is lastly cut at the desired location to achieve the desired size of sandwich-like product. The outer skins may be applied to the core material at any desired time of this process, including during the process or after the core has been created.

Regardless of the method used to create the core product, one advantage is that a lightweight, strong product may be quickly and easily manufactured in a desired size or height. The product of this invention, which is produced according to the processes described herein, has a good strength-to-weight ratio even without forming openings in the web, and may be made from many different materials quickly and inexpensively. The strength-to-weight ratio may be improved by strategic removal of material from the extruded web at some time in the process. The product may be used alone, incorporated into a multi-layered sandwich-like material, or used in any other desired manner.

BRIEF DESCRIPTION OF THE DRAWINGS

The objectives and features of the present invention will become more readily apparent when the following detailed description of the drawings is taken in conjunction with the accompanying drawings in which.

DETAILED DESCRIPTION OF THE DRAWINGS

Figure 5A:
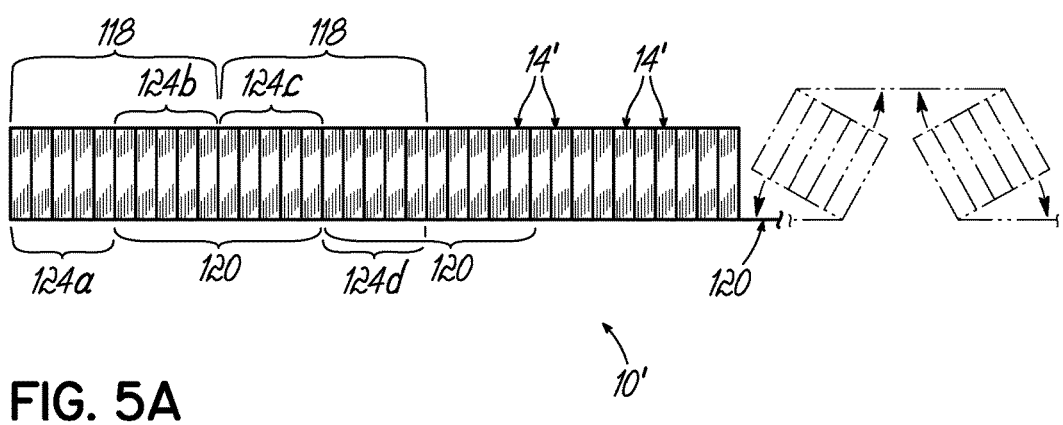
FIG. 5A is a side elevational view of the web of FIG. 4A after orientation to create a portion of a honeycomb product.
Figure 5B:
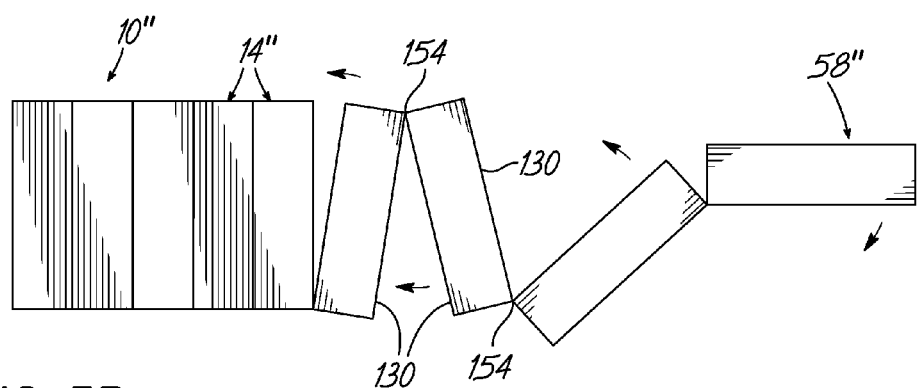
FIG. 5B is a perspective view of a portion of the plastically deformed web of FIG. 4B being folded to create rows of cells.
Figure 5:
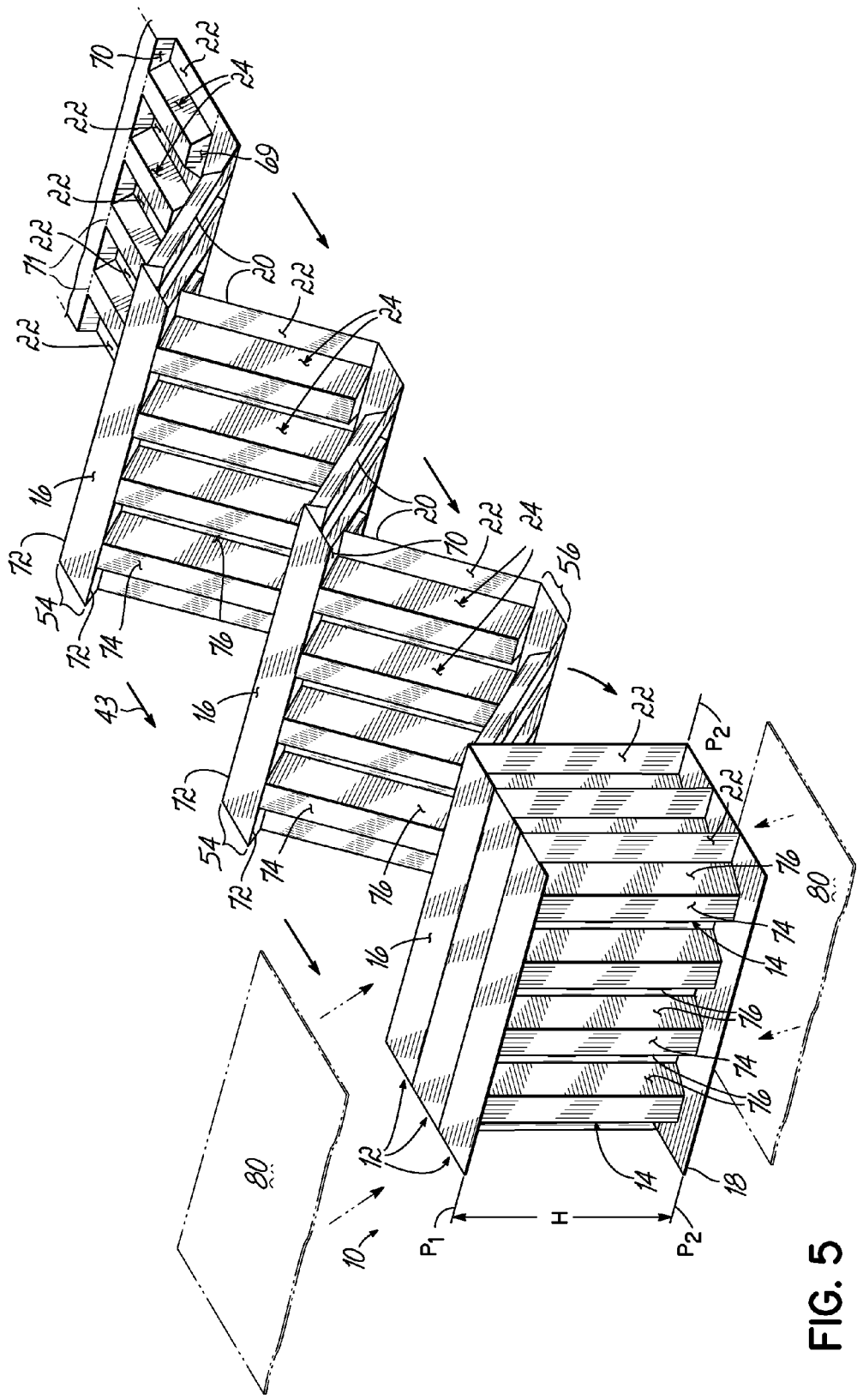
FIG. 5 is a perspective view of a portion of the plastically deformed web of FIG. 3 being further folded to create a portion of a honeycomb product.
Figure 6:
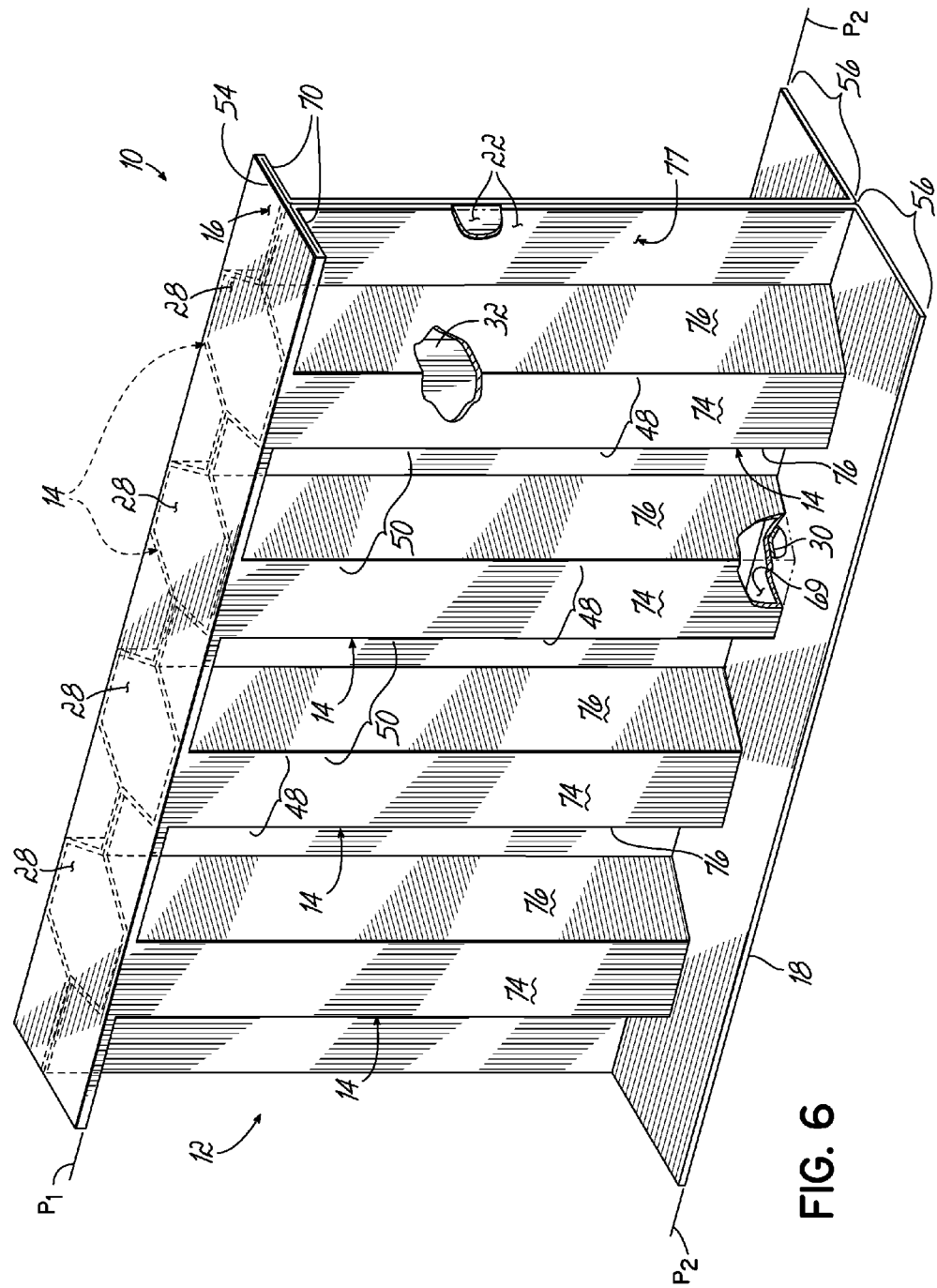
FIG. 6 is a perspective view of a row of cells.

Referring to FIG. 5, a portion of a honeycomb product 10, according to one embodiment of this invention, is shown. The honeycomb product 10 may be made using numerous processes, including those described herein and others within the scope of the claims. FIG. 5 shows a portion of a honeycomb product 10 comprising a plurality of rows 12 of identical cells 14 made from extruded web or sheet of material. FIG. 6 illustrates one such row 12 of cells 14. Referring to FIG. 5, the honeycomb product 10 has a generally planar upper surface 16 in a generally horizontal plane P1 and a generally planar lower surface 18 in a generally horizontal plane P2, the distance between which defines the height H of the honeycomb product 10. The height H of the honeycomb product 10 may be any desired distance and is not intended to be limited to the height of the illustrated portion of the honeycomb product.

Figure 4A:
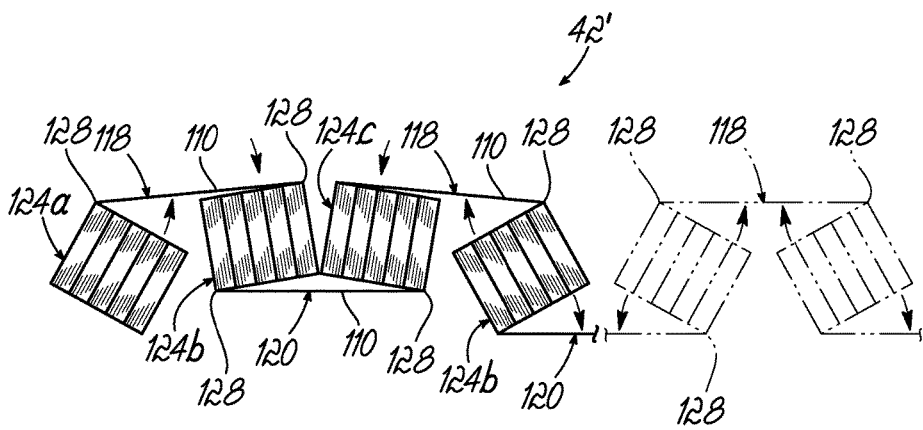
FIG. 4A is a side elevational view of the web of FIG. 3A being folded to create re-oriented portions containing channels.
Figure 4:
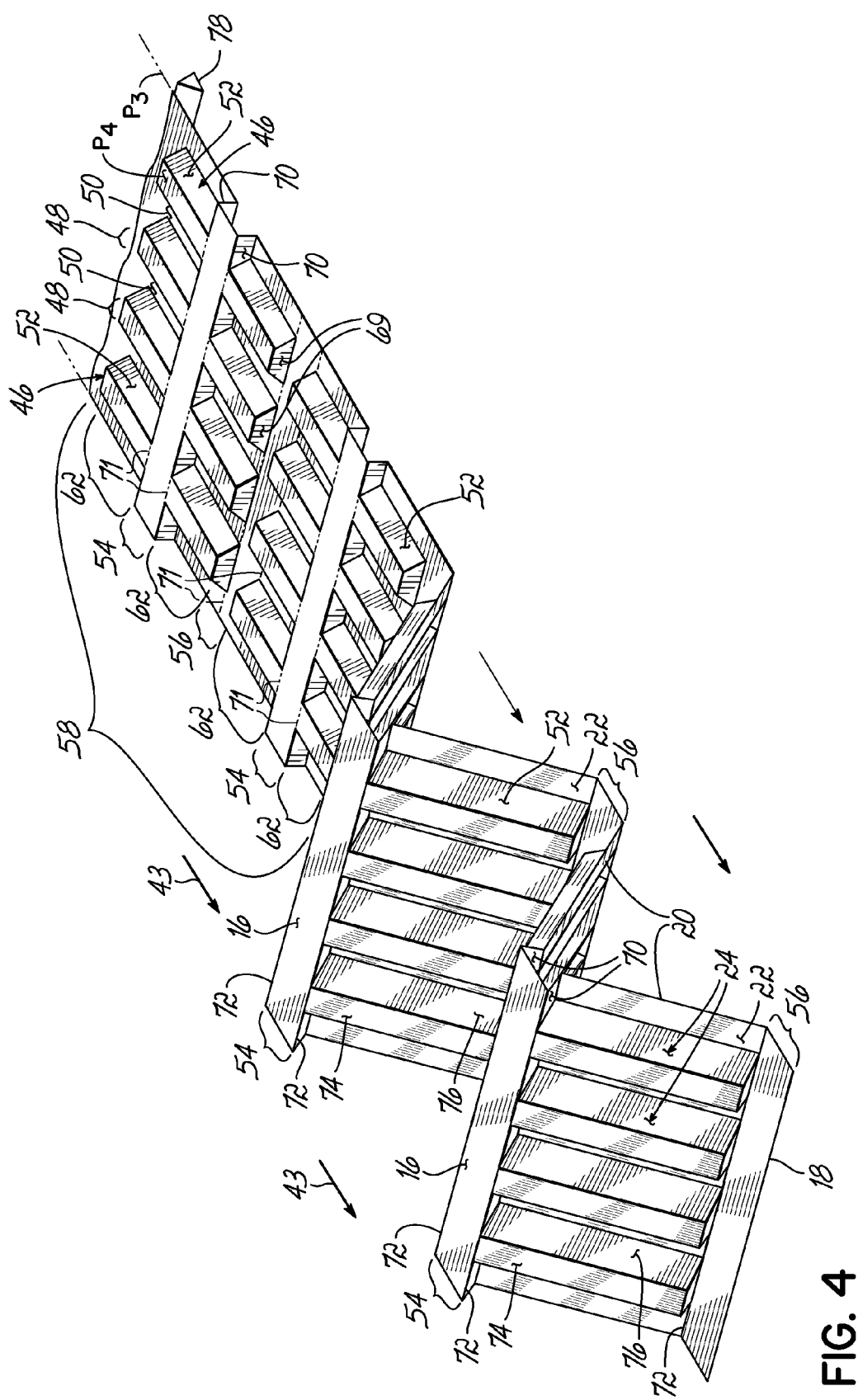
FIG. 4 is a perspective view of a portion of the plastically deformed web of FIG. 3 being folded to create rows of cells.

As shown in FIGS. 4 and 5, each row 12 of cells 14 is made by bringing two adjacent hinged row walls 20 together in an accordion-like manner. Each row wall 20 has alternating planar and non-planar regions or areas 22, 24, respectively. Each non-planar region 24 in FIGS. 4 and 5 comprises three rectangular walls comprising a half-hexagon in cross-section. Regions 24 are bounded by planar regions 22. During the process of making the honeycomb product 10, adjacent row walls 20 are brought together so that the planar regions 22 of adjacent row walls 20 at least partially contact each other and the non-planar regions 24 of row walls 20 define sides or side walls 74, 76 of cells 14.

In certain applications, such as, for example, when a web of thermoplastic material is heated at some stage in the manufacture of the honeycomb product 10, the planar regions 22 of adjacent row walls 20 may be bonded, welded or secured to each other without any additional material. Alternatively, adhesive or other bonding agent may be used to secure adjacent row walls 20 together to complete the rows 12 of cells 14. The non-planar regions 24 of adjacent row walls 20 are spaced apart and define the shape or configuration of the cells 14 after the manufacturing process has been completed. Outermost portions or sides 74 of adjacent cells 14 in different rows 12 may contact each other and may be secured to each other in certain applications of this invention.

Although the drawings illustrate each non-planar region 24 of each row wall 20 having a cross-sectional configuration of a half-hexagon, the non-planar regions of the row walls may have any desired cross-sectional configuration, such as, for example, a curved or arcuate or sinuous cross-sectional configuration. The creation of the side walls or sides 74, 76 of the cells 14 is described in more detail below. Depending upon the application, the cells 14 may be any desired shape or size.

As best illustrated in FIG. 6, each cell 14 has a top 28 and a bottom 30 of a predetermined size and/or shape. As shown in FIG. 5, the tops 28 of the cells 14 are located in plane P1 and make up part of the upper surface 16 of the honeycomb product 10. Likewise, the bottoms 30 of the cells 14 are located in plane P2 and make up part of the lower surface 18 of the honeycomb product 10. The top 28, bottom 30 and sides 72, 74 of the cell 14 define a cell interior 32.

In the illustrated embodiment, each cell top 28 and bottom 30 is a polygon and, more particularly, a hexagon. However, if the non-planar regions of the row walls were in the shape of half a cylinder, then the tops and bottoms of the cells would be circular or oval and the cells would have a cylindrical interior.

Figure 1:
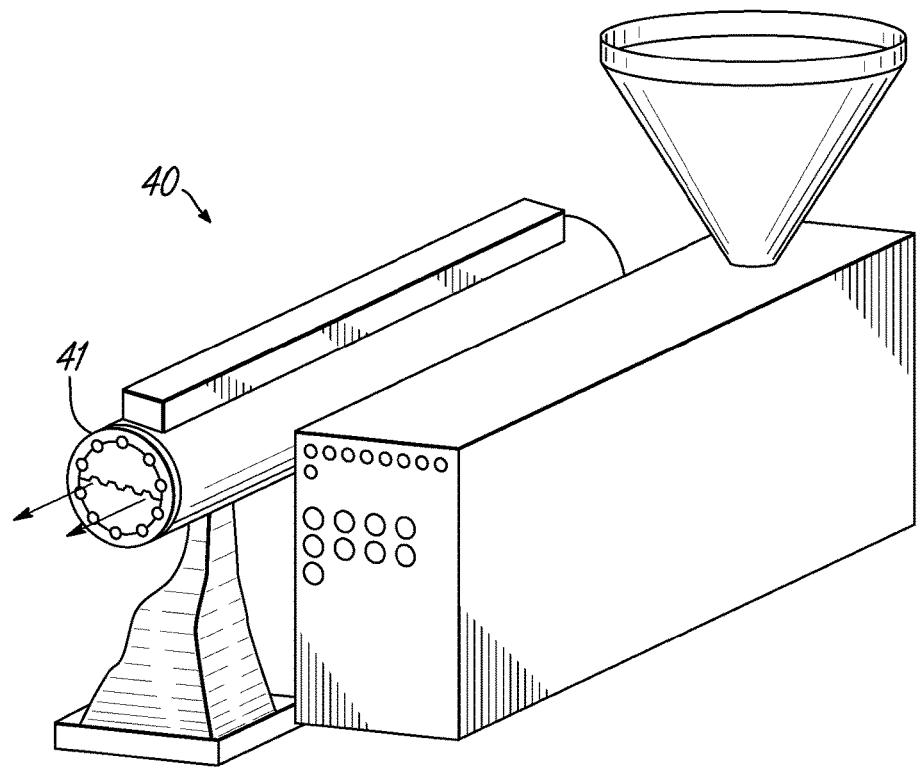
FIG. 1 is a perspective view of a web of material having a generally non-planar, cross-section being extruded from an extruder.

FIGS. 1-4 illustrate a method or process of making a honeycomb product 10 which may be used alone, in a multi-layered material or product, or in any desired manner. FIG. 1 illustrates an extruder 40 extruding a web of material 42, which is shown in more detail in FIG. 2. Although one configuration of extruder 40 and extruder head 41 is illustrated, any type or configuration of extruder known in the art may be used. The extruder and extruder head configurations will vary as a function of the material being extruded and the cross-section of the extrudate. The material can include any of a variety of plastic compositions and any other material capable of being extruded, and can encompass additional compositions which can be further processed to produce a honeycomb product.

Figure 2:
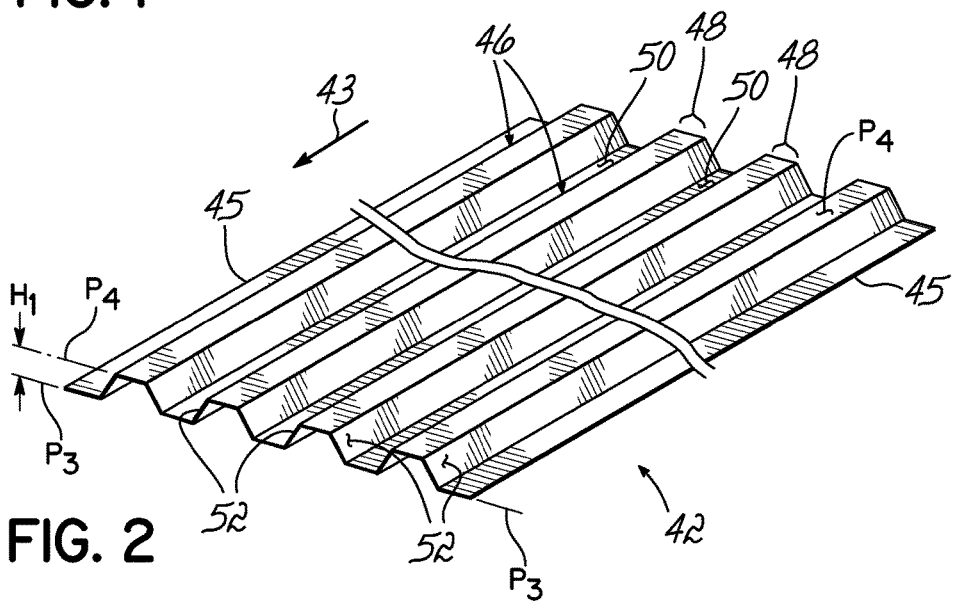
FIG. 2 is a perspective view of a portion of the extruded web of FIG. 1.

In FIG. 2, the extruded web 42 travels in a direction indicated by arrow 43. The extrudate 42 has a pair of opposed side edges 45, the linear distance between which defines the width or transverse dimension of the extruded web 42. The extruded web 42 may be any desired material of any desired thickness and/or width.

Figure 1A:
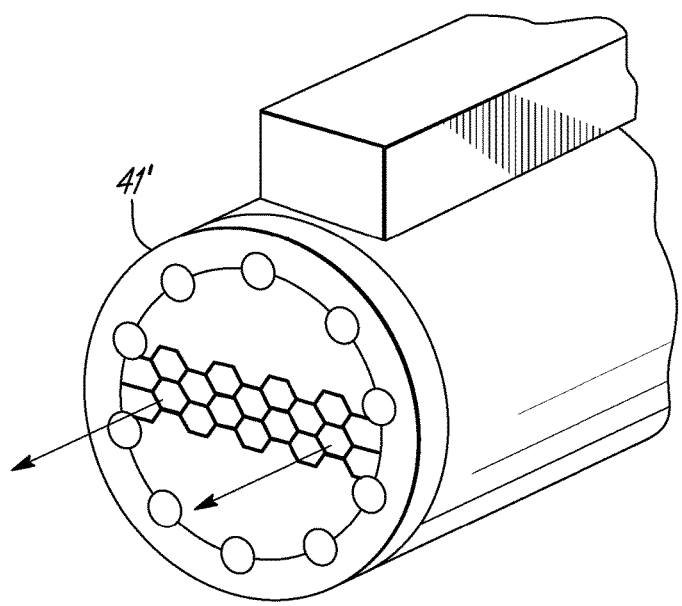
FIG. 1A is a perspective view of a web of material having a generally non-linear, cross-section being extruded from an extruder head of alternate design.

The extruded web 42 has a generally non-linear, cross-section or cross-sectional configuration. In cross-section, the extruded web 42 has a generally corrugated configuration or shape, including a plurality of flattened peaks 48 and a plurality of flattened valleys 50 joined together by connecting portions 52. Each of the flattened peaks 48, flattened valleys 50 and connecting portions 52 is longitudinally extending as shown in FIG. 2. The flattened valleys 50 are all generally co-planar in a horizontal plane P3. Likewise, the flattened peaks 48 are all generally co-planar in a horizontal plane P4 above the plane P3. The linear distance between the planes P3 and P4 defines the height H1 of the corrugations 46. Although one shape or configuration of extruded web 42 is illustrated in FIG. 2, the extruded web 42 may assume numerous other non-linear configurations in cross-section. For example, the expanded view of the extruder head in FIG. 1A shows an alternate cross-sectional shape which can be used to create the non-linear, cross-section extruded web. A perspective view of the extruded web 42' formed by the alternate extruder head design is provided in FIG. 2A.

Figure 3B:
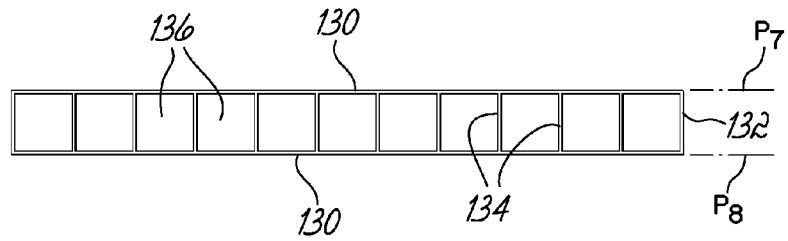
FIG. 3B is an end view of the extruded web of FIG. 2B.
Figure 3C:
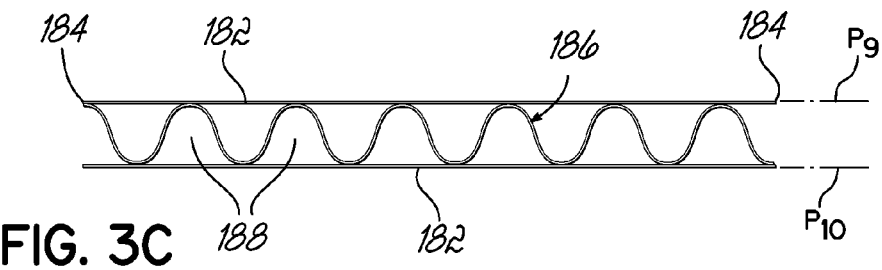
FIG. 3C is an end view of the extruded web of FIG. 2C.
Figure 3:
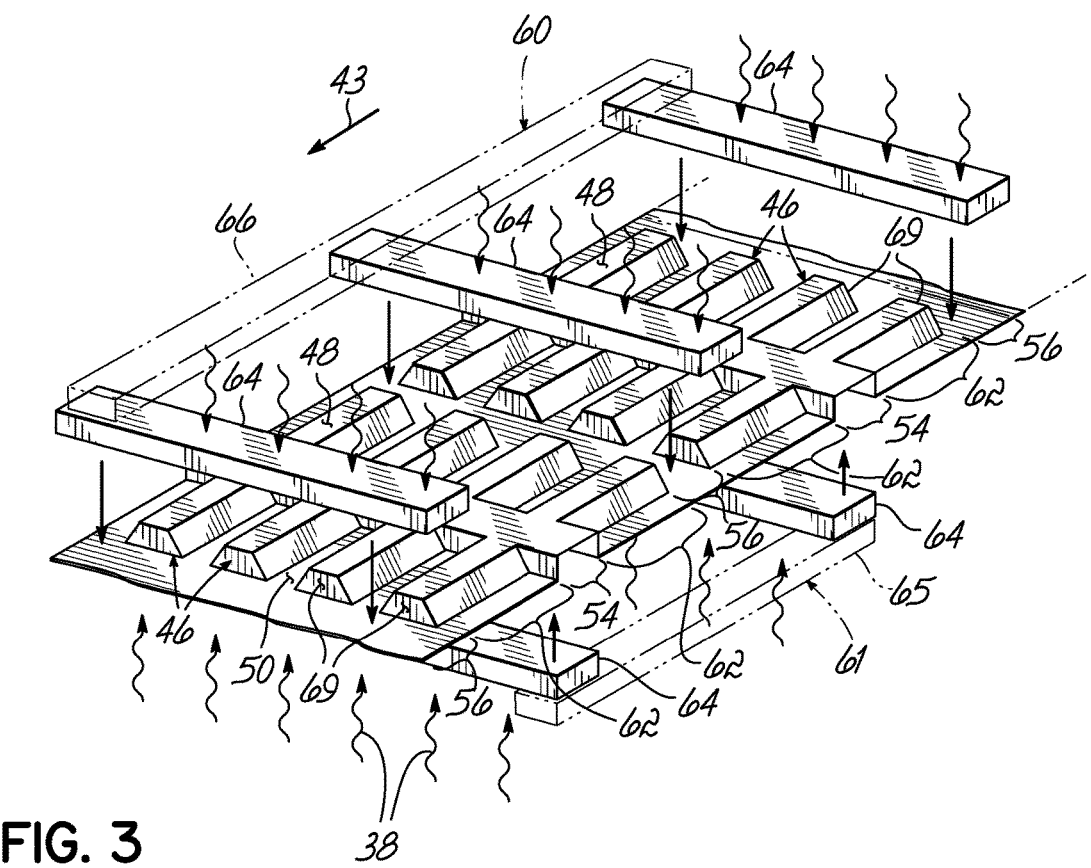
FIG. 3 is a perspective view of a portion of the extruded web of FIG. 2 being treated to create transversely extending flats.

FIGS. 3 and 4 illustrate a step in this process of making honeycomb product 10 comprising plastically deforming or flattening at least selected portions or areas 54, 56 of the extruded web 42 to create a plastically deformed extruded web 58. This plastic deformation may include using movable tools 60, 61, such as shown in FIG. 3 to interrupt the continuous corrugations 46 formed in the emerging extruded web 42 and create a plurality of corrugated regions or areas 62, each comprising a plurality of corrugations 46 extending in a first direction generally parallel the direction of travel 43 of the extruded web 42 or longitudinally, and a plurality of flats or flattened areas 54, 56 each extending in a second direction perpendicular to the first direction, transversely or from side-to-side. The size of these regions or areas 62, 54 and 56 may vary depending upon the desired size or shape of the cells 14 of the honeycomb product 10.

Although tool 60 is illustrated as comprising three bars 64 joined together with connectors 66 (only one being shown for clarity), and tool 61 is illustrated as comprising two bars 64 joined together with connectors 65 (only one being shown for clarity), respectively, these tools 60, 61 may comprise any number of bars of any desired size or configuration joined together or not. Although two tools are illustrated, any number of tools of any desired type or configuration may be used. Again, the term tool is not intended to be limiting and may include any tool known in the art.

During the step of plastically deforming at least selected portions of the extruded web 42, the bars 64 of the tools 60, 61 may be chilled, at ambient temperature, or heated by any desired method to facilitate processing. Such heating is illustrated schematically by arrows 38. This heating step is optional and may be used in certain applications only. In other applications, it may be omitted partially or entirely. Although it is shown schematically after the flats 54, 56 have been created in the extruded web 42, this heating step may occur any time during this manufacturing process.

Due to the creation of the flattened areas or flats 54, 56, each corrugation 46 may have an end portion 69 which extends between a peak 48 and a valley 50. These end portions 69 are illustrated as each being in the shape of a trapezoid, but may be other shapes, depending upon the shape of the corrugations.

As best illustrated in FIGS. 3 and 4, each generally rectangular, transversely extending flat or flattened area 56 is located in the plane P3 of the extruded web 42. Each generally rectangular, transversely extending flat or flattened area 54 is located in plane P4 above the plane P3 of the extruded web 42 and co-planar with the plane of the flattened peaks 48 of corrugations 46. Flattened areas 56 and 54 alternate between corrugated regions 62. As seen in FIG. 4, due to the shape of the tools 60, 61, each flat or flattened area 54 has side walls 70 extending from the outer edges of the flat 54 to the flattened valleys 50 in the corrugated regions 62. These side walls 70 are illustrated as each being in the shape of a trapezoid, but may be other shapes, depending upon the shape of the corrugations. Although not shown, the corrugations may have a semi-circular, sinuous, curved or other cross sectional configuration.

As shown in FIG. 4, the plastically deformed web portion 58 is then folded along transversely extending fold lines 72 located generally on the edges of the flats 54, 56. Such fold lines 72 may be optionally scored or perforated at any step in the manufacturing process with cuts 71 to assist folding. Such scoring may be made by a separate tool or tools. As shown in FIG. 5, after the plastically deformed web portion 58 is folded along transversely extending fold lines 72, side walls 70 lay underneath and may contact the raised flat 54, and end walls 69 of corrugations 46 rest on and contact flats 56.

As best illustrated in FIG. 6, side walls 70 abut and are underneath portions of the raised flats 54. These two-ply areas comprise approximately half of the tops 28 of some of the cells 14. In such cells, the bottom 30 of the cell 14 is a single-ply which was formed in the flat 56 before folding. As shown in FIG. 6, end walls 69 abut and are above portions of the flats 56 to form approximately half of the bottoms 30 of other cells 14. In such cells, the top 28 of the cell 14 is a single-ply which was formed in the flat 54 prior to folding. Thus, in one row 12 of cells 14, each cell 14 has a single-ply top 28 and a double-ply bottom 30. In adjacent rows of cells 14, each cell 14 has a double-ply top 28 and a single-ply bottom 30.

As shown in FIGS. 4, 5 and 6, after the plastically deformed web portion 58 is folded along transversely extending fold lines 72, the corrugations 46 or non-planar regions 24 of the row walls 20 become the side walls 74,76 of the cells 14. More particularly, the generally planar peaks 48 of corrugations 46 shown in FIG. 4 become the outmost side walls 74 of the cells 14, and the generally planar connecting portions 52 of corrugations 46 become additional side walls 76 of the cells 14. As shown in FIGS. 5 and 6, within a row 12 of cells 14, the planar portions 22 of row walls 20 come together to create flattened two-ply portions 77 of row 12. Side walls 74, 76, along with the top 28 and bottom 30 of each cell 14, define a cell interior 32.

The last step in the process is to cut the extruded web 42 at any desired location. FIG. 4 illustrates a cutter 78 at one location. However, one or more cutting tools or devices may be used at any desired location to create a honeycomb product 10 of a desired length.

Figure 7:
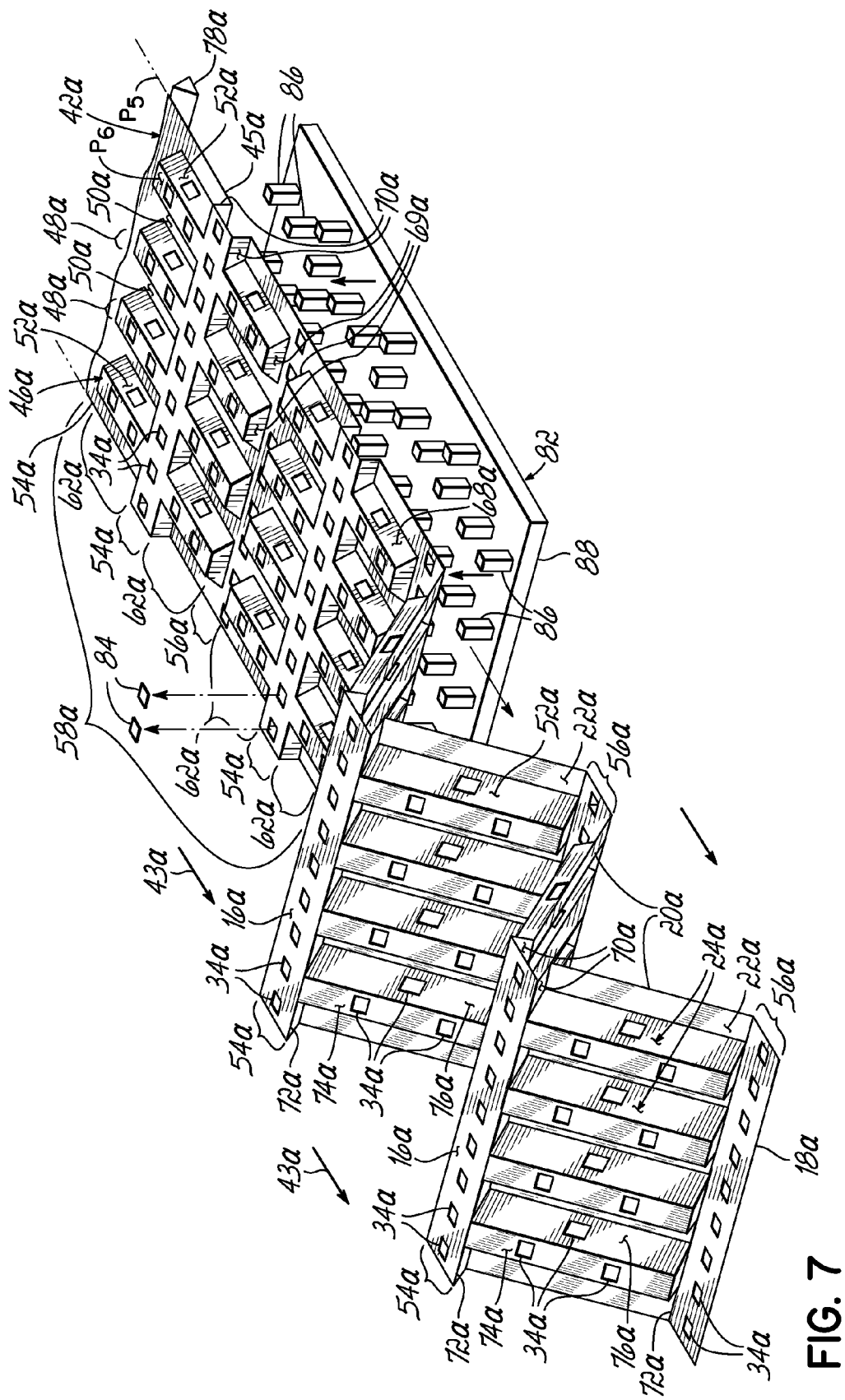
FIG. 7 is a perspective view of a portion of the plastically deformed web of FIG. 4 being treated to create a plurality of openings in the plastically deformed web.
Figure 8B:
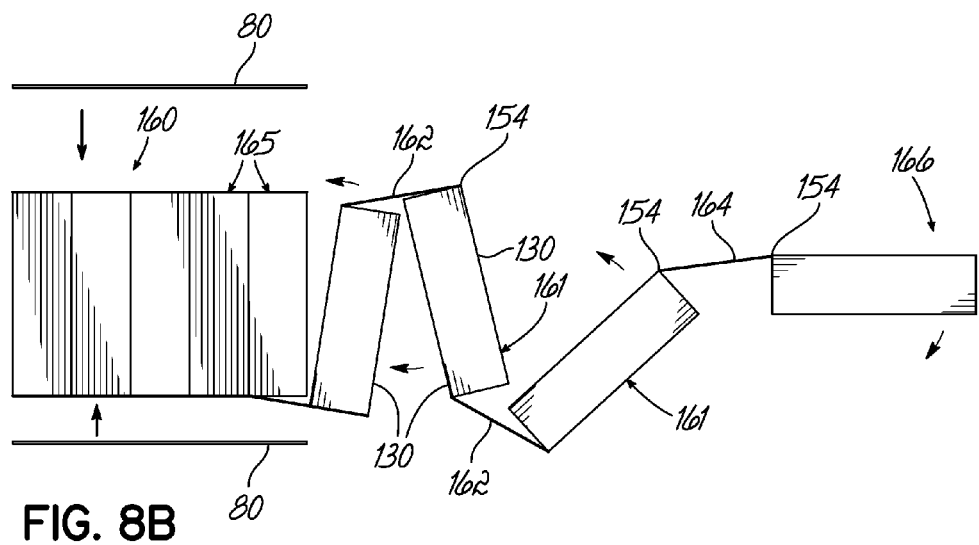
FIG. 8B is a perspective view of a portion of the plastically deformed web of FIG. 7B being folded to create rows of cells.
Figure 8:
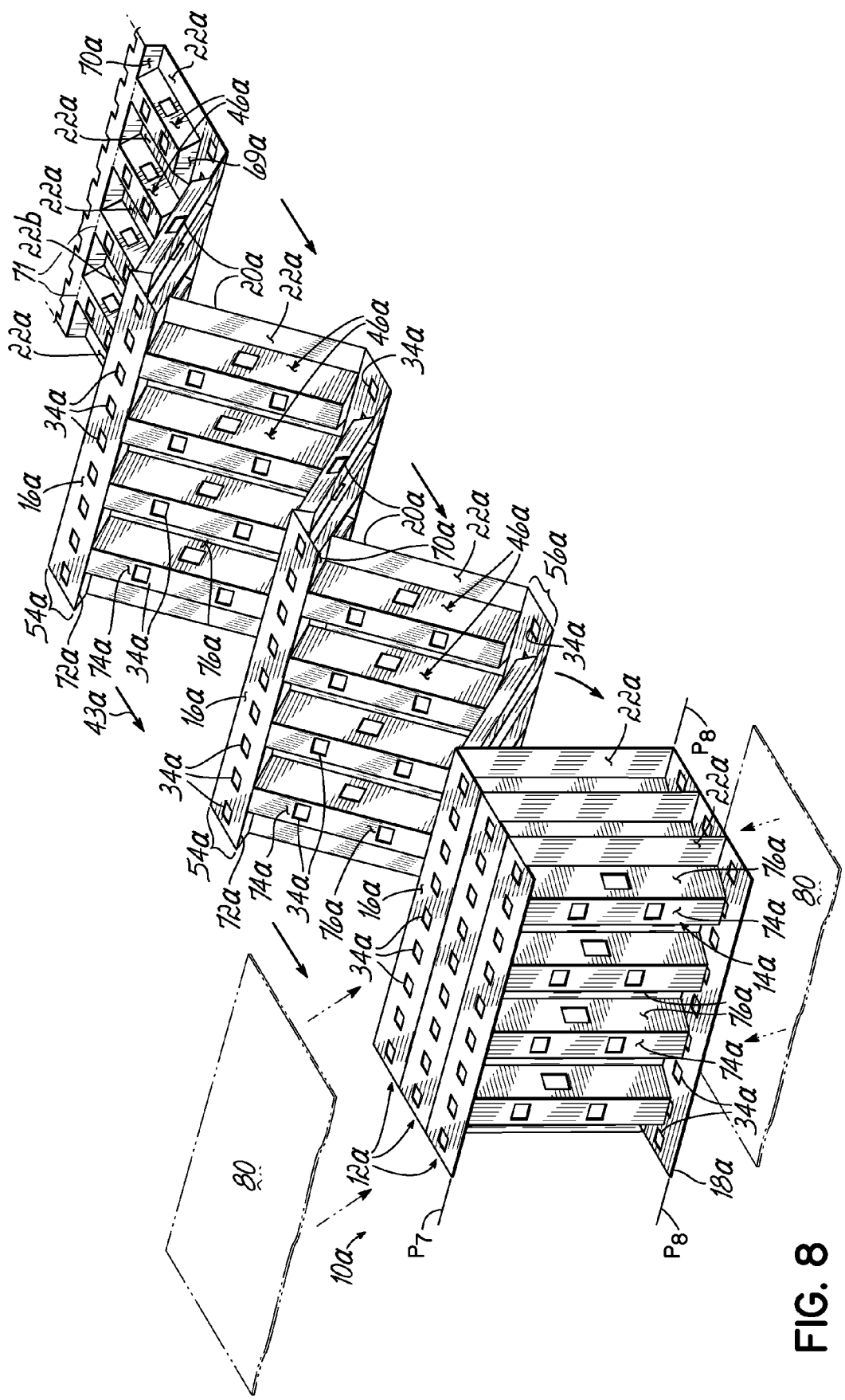
FIG. 8 is a perspective view of a portion of the plastically deformed web of FIG. 7 being further folded to create rows of cells.

FIGS. 7-8 illustrate another method or process of making a honeycomb product which may be used alone or in a multi-layered material or product. FIG. 7 illustrates an extruded web 42*a* traveling in a direction indicated by arrow 43*a* and having a pair of opposed side edges 45*a*, the linear distance between which defines the width or transverse dimension of the extruded web 42*a*. The extruded web 42*a* may be any desired material of any desired thickness and/or width. The extruded web 42*a* is identical to extruded web 42 described above.

The extruded web 42*a* is then treated as described above and illustrated in FIG. 3 to create a plastically deformed web portion 58*a* having a plurality of corrugations 46*a*. As seen in FIG. 7, the corrugations 46*a* may comprise co-planar flattened peaks 54*a* in a plane P6 and flattened valleys 56*a* in the plane P5 of the extruded web 42*a* with generally rectangular flat connecting portions 52*a* extending therebetween. Lastly, each corrugation 46*a* may have an end portion 69*a*. These end portions 69*a* are illustrated as each being in the shape of a trapezoid, but may be other shapes, depending upon the shape of the corrugations.

As best illustrated in FIG. 7, each generally rectangular, transversely extending flat or flattened area 56*a* is located in the plane P5 of the extruded web 42*a*. Therefore, each generally rectangular, transversely extending flat or flattened area 54*a* is located in plane P6 above the plane P5 of the extruded web 42*a* and co-planar with the flattened peaks 48 of corrugations 46*a*. Flattened areas 56*a* and 54*a* alternate between corrugated areas 62*a*. Each flat 54*a* has side walls 70*a* extending from the outer edges of the flat 54*a* to the flattened valleys 50*a* in the corrugated regions 62*a*. These side walls 70*a* are illustrated as each being in the shape of a trapezoid, but may be other shapes, depending upon the shape of the corrugations. Although not shown, the corrugations may have a semi-circular, sinuous, curved or other cross sectional configuration.

FIG. 7 illustrates a movable tool 82 in the form of a punch press which is used to remove material 84 from plastically deformed web 58a in predetermined or preselected locations. In FIG. 7, the punch press or tool 82 has a plurality of punchers 86 mounted on a plate 88 at preselected or predetermined locations or positions to create a plurality of rectangular openings 34a through predetermined or preselected portions of the plastically deformed web 58a. These openings 34a become the openings in the honeycomb product 10a described above. See FIG. 8. Although illustrated as being rectangular, the openings 34a may be of any predefined desired size or shape and strategically located at any desired location on a portion of unrolled web. For example, the holes or openings 34a may be circular and be oriented such that each cell 14 has at least one opening 34a allowing access to the interior of the cell 14.

Although a punch press is illustrated, any other tool, such as a laser cutter, may be used to create the openings 34a through any portion of the plastically deformed portion 58a of the extruded web 42a to lighten the extruded web 42a so that when this portion of the web 42a is formed into a honeycomb product 10a, the resultant honeycomb product 10a has a relatively high strength-to-weight ratio due, at least in part, to the removal of such material during the process of manufacturing the honeycomb product.

Although the tool 82 is illustrated beneath the extruded web 42a, tool 82 may be located above the extruded web 42a or at any desired location. More than one tool may be used if desired.

As shown in FIGS. 7-8, the strategic locations of the openings 34a are such that the openings 34a are located along the flats 54a, 56a of the plastically deformed web 58a, along the flattened peaks 48a of the corrugations 46a and along connecting portions 52a of corrugations 46a. As shown in FIG. 7, each opening 34a is illustrated as being generally rectangular, but may be any predefined or preselected shape or size. As shown in FIGS. 7 and 8, some of the holes 34a in flats 54a, 56a extend through the bottoms 30a and tops 28a of cells 14a. Likewise, holes 34a through the connecting portions 52a of the corrugations 62a extend through the side walls 76a of cells 14a.

As shown in FIG. 7, after the openings 34a have been bored, punched or otherwise made, the plastically deformed web portion 58a is then folded along transversely extending fold lines 72a located generally on the edges of the flats 54a, 56a. As shown in FIGS. 7 and 8, after the plastically deformed web 58a is folded along transversely extending fold lines 72a, side walls 70a lay underneath the raised flats 54a and end walls 69a of corrugations 62a rest on flats 56a.

The last step in the process is to cut the extruded web 42a at any desired location. FIG. 7 illustrates a cutter 78a at one location. However, one or more cutting tools or devices may be used at any desired location to create a honeycomb product 10a of a desired length.

FIG. 8 shows a portion of the resultant honeycomb product 10a along with skins or layers 80 (shown in phantom), one or both of which may be secured to at least one of the upper and lower surfaces 16a, 18a of honeycomb product 10a to create a multi-layered product for any desired use. Such skins may be incorporated into a product having a honeycomb core or product made in accordance with any aspect of the present invention, including via any method described or contemplated herein.

Figure 9:
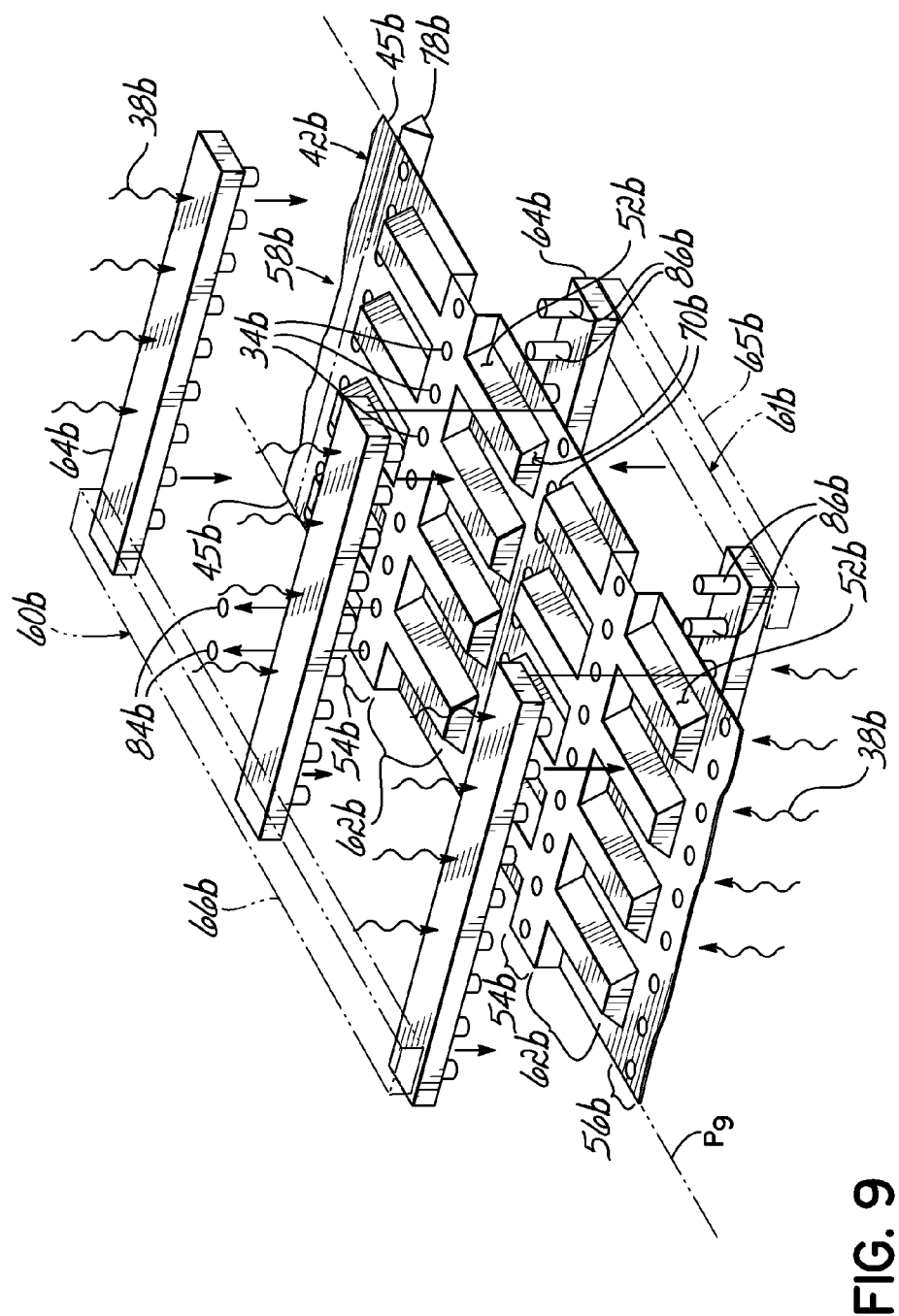
FIG. 9 is a perspective view of an extruded web having been plastically deformed and punched simultaneously according to another aspect of this invention.
Figure 10:
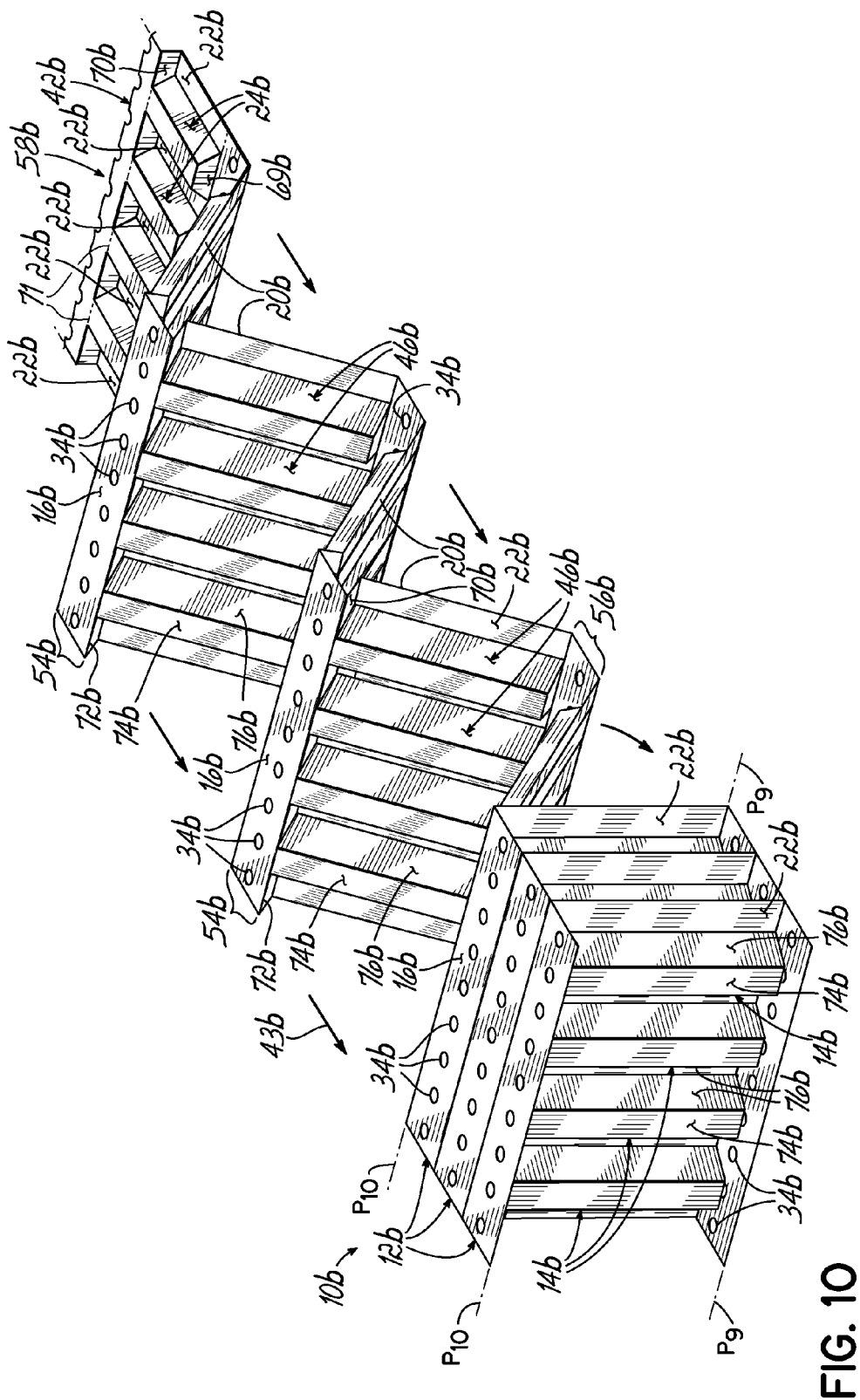
FIG. 10 is a perspective view of a portion of the plastically deformed web of FIG. 9 being folded to create rows of cells.

FIGS. 9-10 illustrate another method or process of making a honeycomb product 10b which may be used alone or in a multi-layered material or product.

FIGS. 9 and 10 illustrate another method or process of making a honeycomb product 10b which may be used alone or in a multi-layered material or product, comprising plastically deforming at least portions of the extruded web 42b. Plastic deformation may include using movable tools 60b, 61b, such as shown in FIG. 9 to create a plurality of corrugated regions or areas 62b comprising a plurality of corrugations 46b extending in a first direction generally parallel the direction of travel 43b of the web 42b or longitudinally, and a plurality of flattened areas or regions 54b, 56b, each extending in a second direction perpendicular to the first direction, transversely or from side-to-side. The size of these regions or areas 62b, 54b and 56b may vary depending upon the desired size or shape of the cells 14b of the honeycomb product 10b. See FIG. 10.

FIG. 9 illustrates movable tools 60b, 61 b, which, in addition to plastically deforming the extruded web 42b, also remove material 84b from plastically deformed web 58b in predetermined or preselected locations. In FIG. 9, each of the tools 60b, 61 b has a plurality of punchers 86b mounted on bars 64b at preselected or predetermined locations or positions to create a plurality of circular openings 34b through predetermined or preselected portions of the plastically deformed web 58b. These openings 34b become the openings in the honeycomb product 10b described above. Although illustrated as circular, the openings 34b may be of any desired shape and strategically located at any desired location on a portion of the extruded web.

Although one configuration of tool 60b (and 61b) is illustrated comprising bars 64b joined by connectors 66b (and 65b), any other configuration or type of tool may be used to plastically deform extruded portions of web 42b. Such tools may simultaneously create openings 34b through any portion of the extruded web to lighten the extruded web 42b so that when this portion of the web 42b is folded to create honeycomb product 10b, the resultant honeycomb product 10b has a relatively high strength-to-weight ratio due, at least in part, to the removal of such material during the process of manufacturing the honeycomb product 10b.

Although the tools 60b and 61 b are illustrated respectively above and below extruded web 42b, the orientation of tools 60b and 61 b may be reversed, or at any other desired location, such as one after the other in a staggered format. Any number of tools 60b, 61 b may be used if desired.

During the step of plastically deforming at least selected portions of the extruded web 42b, the bars 64b of the tools 60b, 61 b may be chilled, at ambient temperature, or heated by any desired method to facilitate processing. Such heating is illustrated schematically by arrows 38b. This heating step is optional and may be used in certain applications only. In other applications, it may be omitted partially or entirely. This heating step may occur any time during this manufacturing process.

As shown in FIG. 10, after the web 42b has been plastically deformed and the openings 34b have been created, the plastically deformed web portion 58b is then folded along transversely extending fold lines 72b located generally on the edges of the flats 54b, 56b. As shown in FIGS. 9 and 10, after the plastically deformed web of material 58b is folded along transversely extending fold lines 72b, side walls 70b lay underneath the raised flats 54b and end walls 62b of corrugations 60b rest on flats 56b.

The last step in the process is to cut the plastically deformed extruded web 58b at any desired location. FIG. 10 illustrates a cutter 78b at one location. However, one or more cutting tools or devices may be used at any desired location to create a honeycomb product 10b of a desired length.

As noted above, the cross-section of the extruded web can assume any number of shapes. FIGS. 1A-5A illustrate an alternative method of producing a honeycomb product and the product made by that method.

Figure 2A:
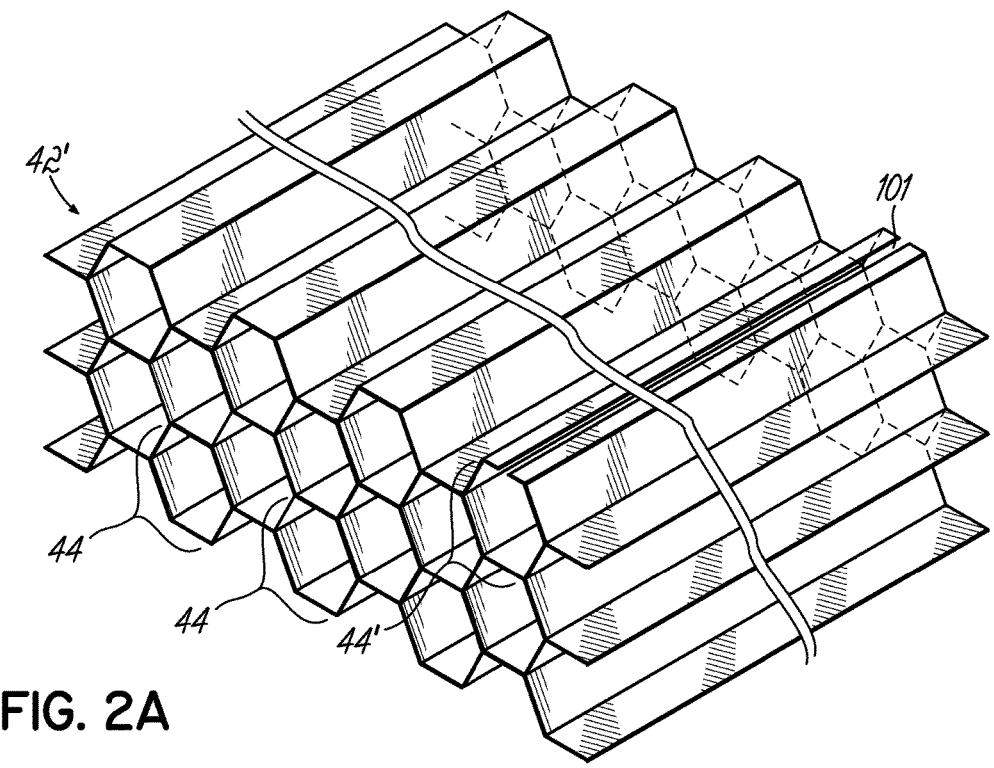
FIG. 2A is a perspective view of a portion of the extruded web of FIG. 1A.

The temperature needed to process a plasticated material through an extruder and out an extruder head, such as 41' in FIG. 1A, in conjunction with the properties of the material being extruded, the extruder speed, and complexity of the desired cross-section shape, may create an extruded web 42' which may retain an unacceptably high internal heat after exiting the extruder head 41'. If not cooled to an acceptable temperature promptly after exiting the extruder head, such an extrudate may warp or show other indicia of degradation due to excessive levels of heat being retained. As shown in FIG. 2A, the channels 44 of the web 42', though open at one end, may be otherwise effectively closed to transport air or other heat exchange medium. Such channels 44 are described herein as being closed.

To improve access, one or more access openings 101 may be introduced into one or more longitudinally extending channels 44 of the web 42'. Creation of an access opening 101 into a channel forms a modified channel 44', described herein as being substantially closed. See FIG. 2A. The access opening 101 may be created in the web 42' by appropriate machining of the extruder head 41', or by the action of a cutting or material-removing tool (not shown) downstream of the extruder head 41'. Only one access opening 101 is shown in FIG. 2A on only one channel 44, but additional channels 44 can have one or more access openings 101, up to all of the channels in the extrudate. The access opening or openings can vary in size or shape as needed to facilitate transport of sufficient quantities of a heat exchange medium between the interior and exterior of a channel 44. The access opening 101 is depicted as being continuous along the channel 44, but this is not required. Any number of access openings 101 may be any desired length. FIG. 1A depicts an alternate extrusion cross-section shape, as shown in extruder head 41'. FIG. 2A depicts an alternate extruded web 42' formed by use of extruder head 41' containing closed corrugations, or channels 44, the channel as depicted having a hexagonal shape in cross-section.

FIGS. 3A-5A depict side elevational views of the process of flattening portions of an extruded web of the general configuration depicted in FIG. 2A having channels therein, followed by folding and re-orienting portions of the extruded web to create a honeycomb structure, portions of the extruded web being re-oriented at 90° relative to their original machine direction orientation or position.

Figure 3A:
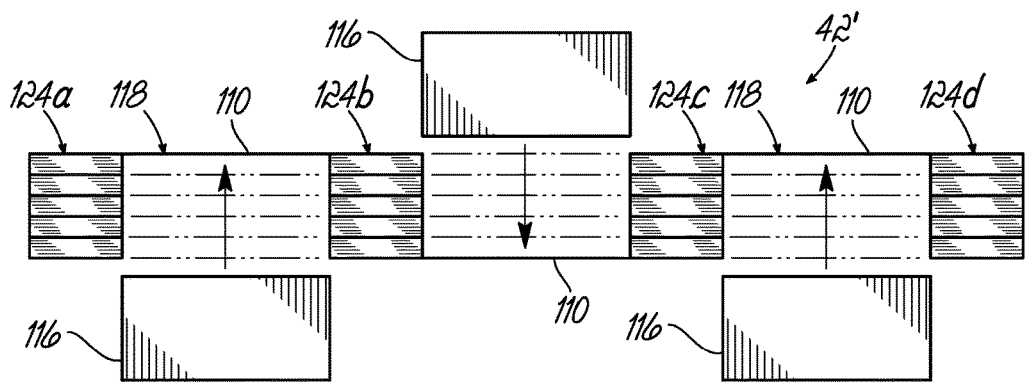
FIG. 3A is a side elevational view of a portion of the extruded web of FIG. 1A being treated to create transversely extending flats.

As shown in FIG. 3A, sections 110 of the extruded web 42' may be flattened by tools 116, alternating the sections 110 being compressed into upper flats 118 and lower flats 120. Tool 116 may apply pressure only, heat only, or a combination of pressure and heat, to create flats 118, 120.

Additional portions 124a-d shown in FIG. 3A each contain at least one channel disposed horizontally, which may be either closed or substantially closed. At least one portion is capable of being manipulated by a folding operation to mate with an adjacent portion, i.e., 124a with 124b, 124b with 124c, or 124c with 124d, as shown in FIGS. 4A and 5A, to form vertically oriented cells 14'.

FIG. 4A depicts portions 124a-d in varying degrees of re-orientation, from an original machine direction having closed channels disposed horizontally, to an orientation at 90° relative to the original machine direction, wherein the channels, now cells 14', are substantially vertical. The portions 124a-d re-orient along hinge lines 128.

FIG. 5A depicts the portions 124a-d, along with similarly disposed portions, after folding and re-orientation. The resulting honeycomb product 10' is comprised in part of re-oriented portions 124a, 124b, 124c, and 124d, with upper flats 118 and lower flats 120, respectively, disposed above and below selected portions 124a-124d, the upper and lower flats being offset relative to each other.

Figure 1B:
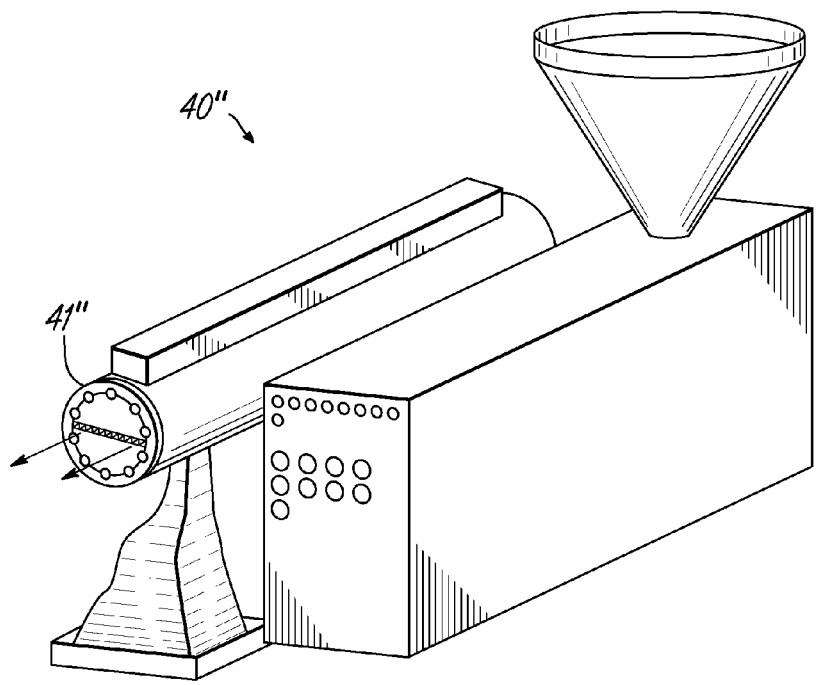
FIG. 1B is a perspective view of a web of material having a generally non-linear, cross-section being extruded from an extruder head of alternate design.
Figure 2B:
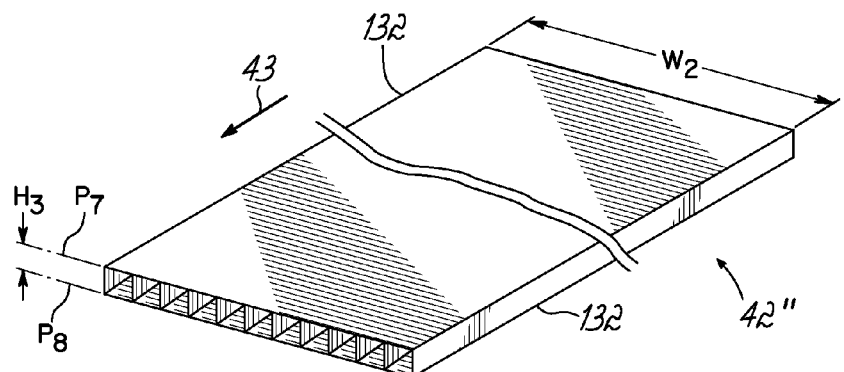
FIG. 2B is a perspective view of a portion of the extruded web of material extruded from the extruder head of FIG. 1B.

FIG. 1B depicts an extruder 40" with an alternate extruder head 41" used to extrude an extrusion 42" having a non-planar profile and non-linear cross-section, as shown in FIGS. 2B and 3B. FIG. 2B depicts a portion of the extruded web 42" formed by use of extruder head 41", the extruded web 42" having a non-linear, cross-section. For purposes of this document, the portion of extruded web 42" shown in FIG. 2B has a non-planar profile because it does not comprise a single solid flat sheet of material. The present invention is intended to cover all extrusions which are not solid flat sheets or webs of material.

As seen in FIG. 3B, the extruded web 42" has spaced upper and lower horizontal walls 130 in planes P7 and P8, the linear distance between these planes defining the height H2 of the extrudate 42". The extrudate 42" also has side walls 132, the distance between which defines the width or transverse dimension W2 of the extrudate 42". Lastly, the extrudate 42" has a plurality of spacers 134 extending between the horizontal walls 130 and spaced from each other so as to define a plurality of flutes or channels 136 which extend longitudinally or in the direction of travel 43 of the web. As shown in FIG. 3B, these flutes or channels 136 have a rectangular shape in cross-section. As seen in FIG. 2B, the extruded web 42" travels in a direction indicated by arrow 43. The extruded web 42" may be any desired material of any desired thickness and/or width. This type of extrusion, if made of plastic, is known as one type of corrugated plastic.

One advantage of the present invention is the ability to extrude a product with reduced weight or density compared to the weight or density of a single solid sheet or web of the same material of the same dimensions. Due to the presence of holes, flutes or channels 136 in the extrudate 42", as best shown in FIG. 3B, the weight of any length of extrudate 42" is less than half the weight of a solid piece of material of the same dimensions. The same is also true of the extrudate shown in FIG. 2.

Figure 4B:
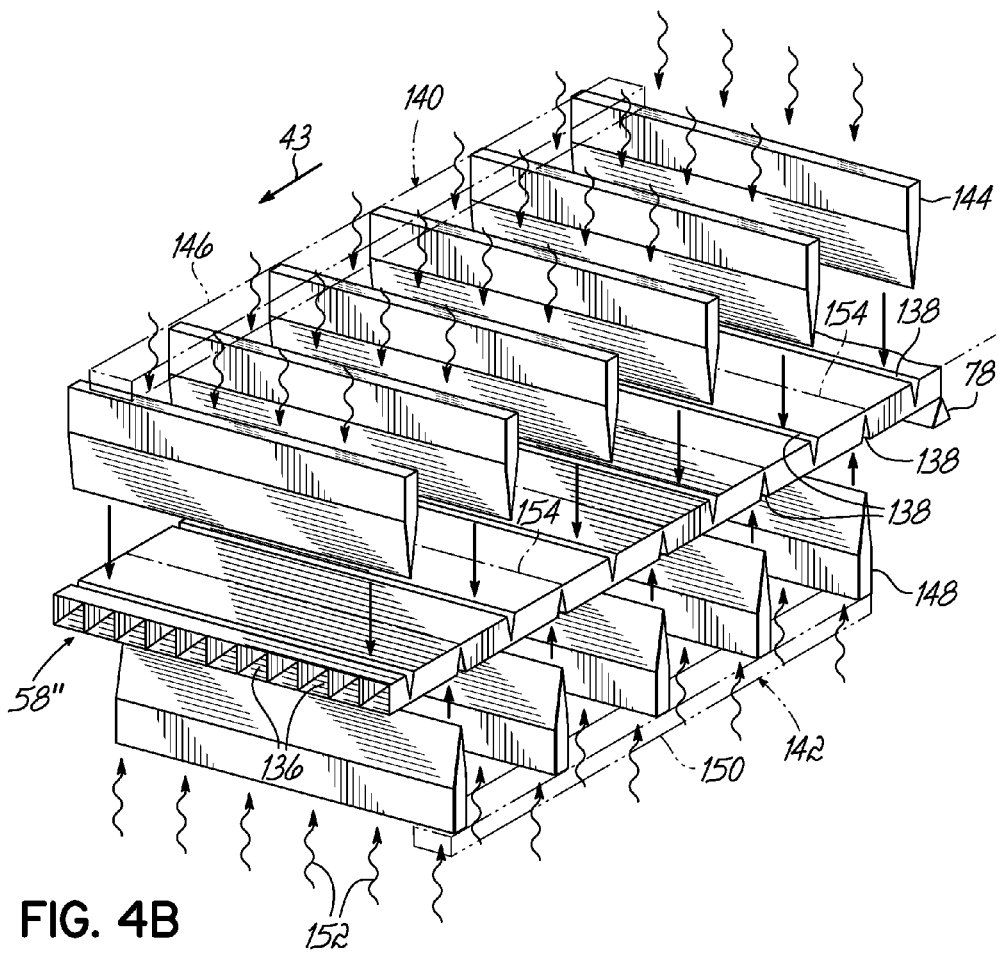
FIG. 4B is a perspective view of a portion of the extruded web of FIG. 2B being treated to create a plurality of plastically deformed areas or regions.

FIGS. 4B and 5B illustrate additional steps in this process of making product 10". FIG. 4B illustrates the step of plastically deforming at least selected portions or areas 138 of the extruded web 42" to create a plastically deformed extruded web 58". This plastic deformation may include using movable tools 140, 142, such as shown in FIG. 4B, to interrupt the continuous corrugations or flutes 136 formed in the emerging extruded web 42" and create a plurality of generally V-shaped plastically deformed regions or areas 138, each extending generally perpendicular to the direction of travel 43 of the extruded web 42" transversely or from side-to-side. The size of these regions or areas 138 may vary depending upon numerous factors, including the desired size or shape of the cells 14 of the resulting product 10".

Although tool 140 is illustrated as comprising six deforming members 144 joined together with connectors 146 (only one being shown for clarity), and tool 142 is illustrated as comprising five deforming members 148 joined together with connectors 150 (only one being shown for clarity), respectively, these tools 140, 142 may comprise any number of deforming members of any desired size or configuration, joined together or not. Although two movable tools are illustrated, any number of tools of any desired type or configuration may be used. Again, the term tool is not intended to be limiting and may include any tool known in the art.

During the step of plastically deforming at least selected portions of the extruded web 42", the deforming members 144, 148 of tools 140, 142, respectively, may be chilled, at ambient temperature, or heated by any desired method to facilitate processing. Such heating is illustrated schematically by arrows 152. This heating step is optional and may be used in certain applications only. In other applications, it may be omitted partially or entirely. Although it is shown schematically during the creation of the plastic deformed areas 138 of the extruded web 42" using tools 140, 142, this heating step may occur any time during this manufacturing process.

Figure 6B:
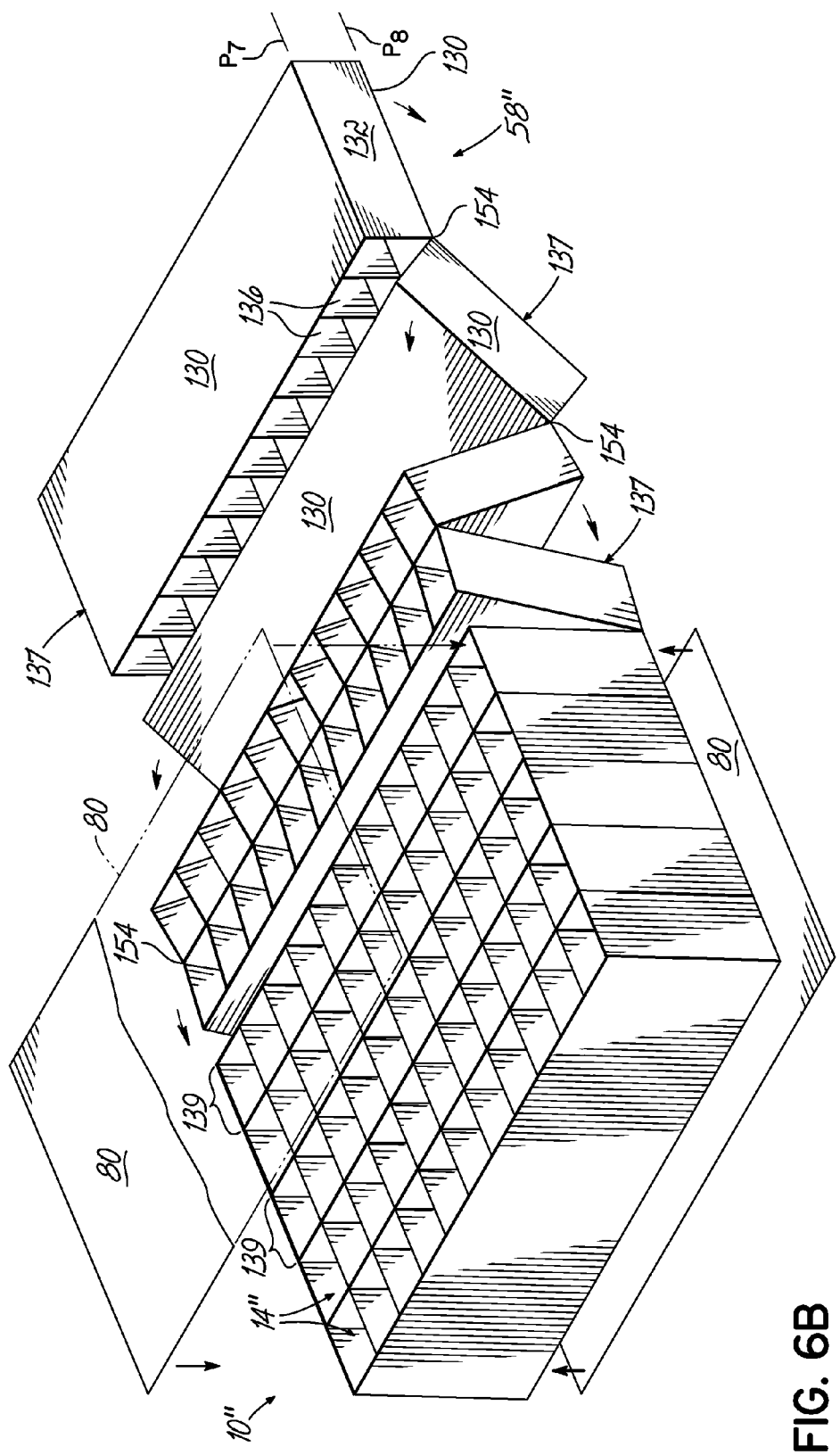
FIG. 6B is a perspective view of a portion of the extruded web of FIGS. 1B-5B being folded to create a portion of a product.

As shown in FIGS. 5B and 6B, the plastically deformed web portion 58" is then folded along transversely extending fold lines 154 located generally in the planes P7 and P8 of the extrudate 42". See FIG. 3B. Such fold lines 154 may be optionally scored or perforated at any step in the manufacturing process with cuts (not shown) to assist folding. Such scoring may be made by a separate tool or tools. As shown in FIG. 6B, after the plastically deformed web portion 58" is folded along transversely extending fold lines 154, horizontal walls 130 of extrudate 42" become vertically orientated, and the flutes 136 become the vertically oriented cells 14" of the resultant product 10".

Another step in the process may be to cut the extruded web 42" at any desired location. FIG. 4B illustrates a cutter 78 at one location. However, one or more cutting tools or devices may be used at any desired location to create a product 10" of a desired length.

FIG. 6B shows a portion of the resultant product 10" along with skins or layers 80 (shown in phantom), one or both of which may be secured to at least one of the upper and lower surfaces of product 10" to create a multi-layered or sandwich-like product for any desired use. As shown in FIG. 6B, the plastically deformed web 58" is folded alternatively in upper and lower planes P7 and P8 to create a plurality of blocks 137, each block 137 containing a row 139 of vertically oriented cells 14". If desired, adjacent blocks 137 may be adhesively or otherwise joined to each other to create product 10", with or without any skins 80.

Figure 7B:
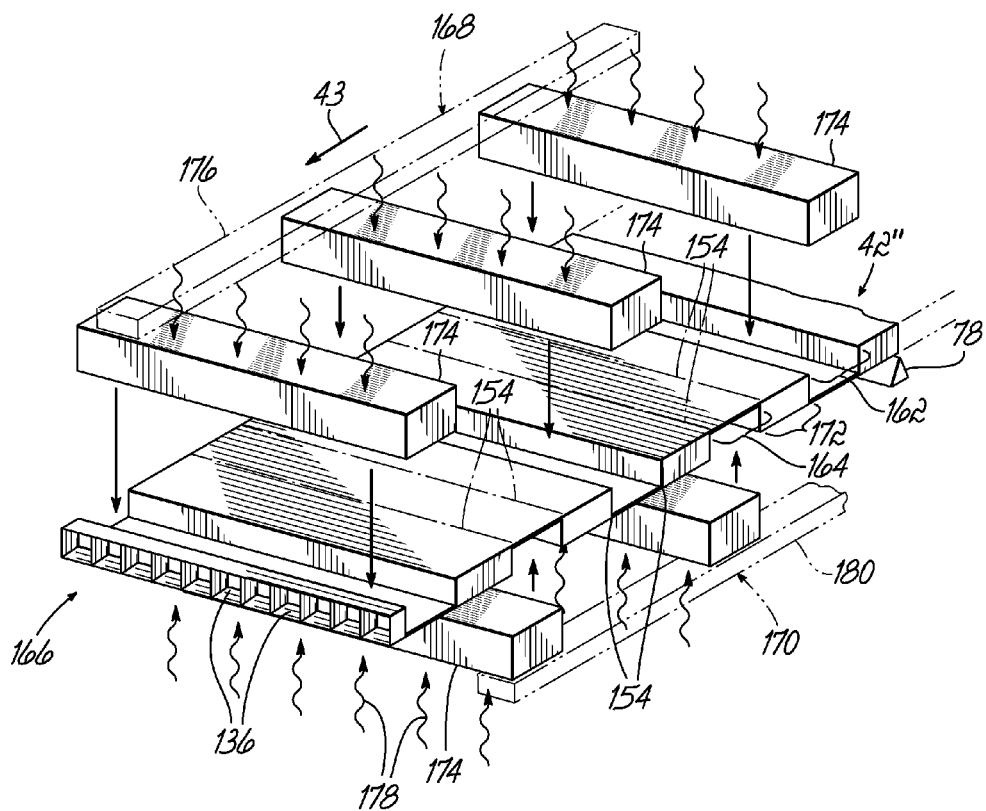
FIG. 7B is a perspective view of a portion of the extruded web of FIG. 2B being treated to create a plurality of plastically deformed areas or regions in the form of flats.

FIGS. 7B and 8B illustrate another method or process of making a product 160, which may be used alone or in a multi-layered material or product. FIG. 7B illustrates an extruded web 42" like the one described above and shown in FIGS. 1B, 2B and 3B, traveling in a direction indicated by arrow 43.

This method comprises plastically deforming or flattening at least selected portions or areas 162, 164 of the extruded web 42" to create a plastically deformed extruded web 166. This plastic deformation may include using movable tools 168, 170, such as shown in FIG. 7B to interrupt the continuous corrugations or flutes 136 formed in the emerging extruded web 42" and create a plurality of non-deformed regions or areas 172 and a plurality of flats or flattened areas 162, 164, each extending in a second direction perpendicular to the direction of travel of the extruded web, transversely or from side-to-side. The size and location of these regions or areas 162, 164 and 172 may vary depending upon the desired size or shape of the cells 165 of the resultant product 160.

Although tool 168 is illustrated as comprising three bars 174 joined together with connectors 176 (only one being shown for clarity), and tool 170 is illustrated as comprising two bars 174 joined together with connectors 180 (only one being shown for clarity), respectively, these tools 168, 170 may comprise any number of bars of any desired size or configuration joined together or not. Although two tools are illustrated, any number of tools of any desired type or configuration may be used. Again, the term tool is not intended to be limiting and may include any tool known in the art.

During the step of plastically deforming at least selected portions of the extruded web 42", the bars 174 of the tools 168, 170 may be chilled, at ambient temperature, or heated by any desired method to facilitate processing. Such heating is illustrated schematically by arrows 178. This heating step is optional and may be used in certain applications only. In other applications, it may be omitted partially or entirely. Although it is shown schematically after the flats 162, 164 have been created in the extruded web 42", this heating step may occur any time during this manufacturing process.

As best illustrated in FIGS. 7B and 8B, each generally rectangular, transversely extending flat or flattened area 162 is located in the plane P8 of the extruded web 42". Each generally rectangular, transversely extending flat or flattened area 164 is located in plane P7 above the plane P8 of the extruded web 42". Flattened areas 162 and 164 alternate between corrugated or non-deformed regions 172. Each corrugated region 172 comprises rows of corrugations.

As shown in FIG. 5B, the plastically deformed web portion 166 is then folded along transversely extending fold lines 154 located generally in the planes P7 and P8 of the extrudate 42". See FIG. 3B. Such fold lines 154 may be optionally scored or perforated at any step in the manufacturing process with cuts (not shown) to assist folding. Such scoring may be made by a separate tool or tools. As shown in FIG. 6B, after the plastically deformed web portion 166 is folded along transversely extending fold lines 154, horizontal walls 130 of extrudate 42" become vertically orientated, and the flutes 136 become the cells 14" of the resultant product 160.

FIG. 8B shows a portion of the resultant product 160 along with skins or layers 80 (shown in phantom), one or both of which may be secured to at least one of the upper and lower surfaces of product 160 to create a multi-layered or sandwich-like product for any desired use. As shown in FIG. 8B, the plastically deformed web 166 is folded alternatively in upper and lower planes P7 and P8 to create a plurality of blocks 161, each block 161 containing a row of vertically oriented cells like the ones shown in FIG. 6B. If desired, adjacent blocks 161 may be adhesively or otherwise joined to each other to create product 160 with or without skins 80.

Another step in the process may be to cut the extruded web 166 at any desired location. FIG. 7B illustrates a cutter 78 at one location. However, one or more cutting tools or devices may be used at any desired location to create a product 160 of a desired length.

Figure 1C:
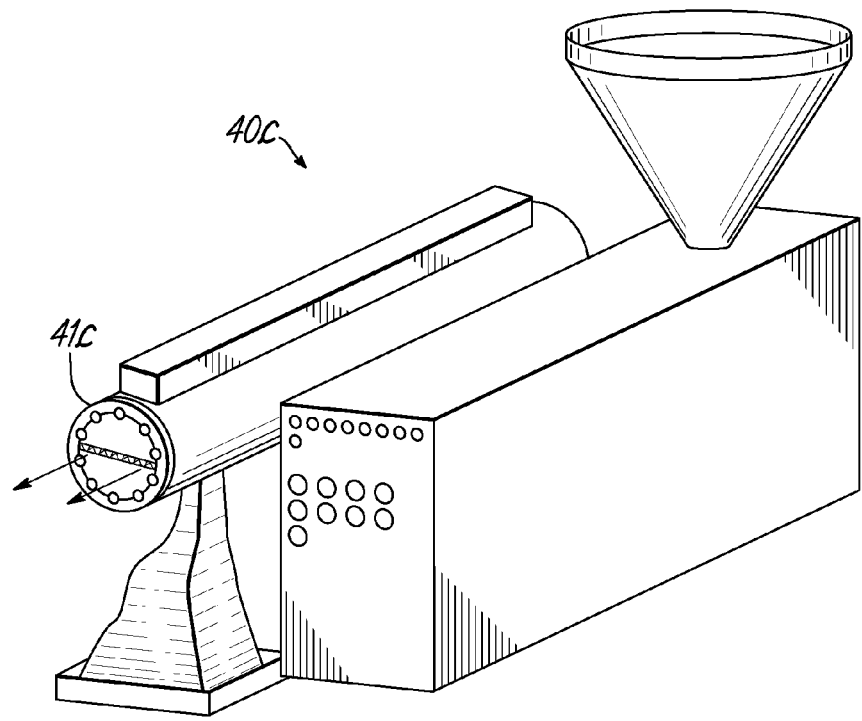
FIG. 1C is a perspective view of a web of material having a generally non-linear cross-section being extruded from an extruder head of alternate design.
Figure 2C:
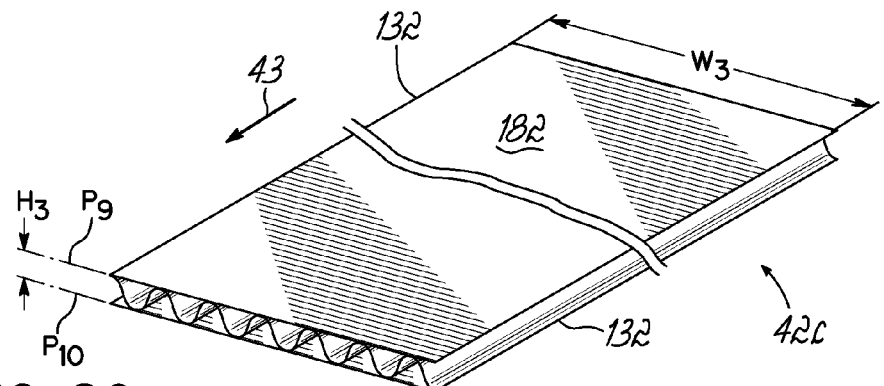
FIG. 2C is a perspective view of a portion of the extruded web of material extruded from the extruder head of FIG. 10.

FIG. 1C depicts an extruder 40*c* with an alternate extruder head 41*c* used to extrude an extrusion having a non-planar profile and non-linear, cross-section, as shown in FIGS. 2C and 3C. FIG. 2C depicts a portion of the extruded web 42*c* formed by use of extruder head 41*c*, the extruded web 42*c* having a non-linear, cross-section. FIG. 2C depicts an alternate extruded web 42*c* formed by use of extruder head 41*c*, the extruded web 42*c* having a non-linear, cross-section. As seen in FIG. 3C, the extruded web 42*c* has spaced upper and lower horizontal walls 182 in planes P9 and P10, the linear distance between these planes defining the height H3 of the extrudate 42*c*. The extrudate 42*c* also has side edges 184, the distance between which defines the width or transverse dimension W3 of the extrudate 42*c*. Lastly, the extrudate 42*c* has a sinuous middle member 186 extending between the horizontal walls 182 so as to define a plurality of flutes or channels 188 which extend longitudinally. As seen in FIG. 2C, the extruded web 42c travels in a direction indicated by arrow 43. The extruded web 42c may be any desired material of any desired thickness and/or width. Such an extruded web 42c may be treated or processed as described above to create a product for use alone or in a sandwich-like core product.

Figure 11:
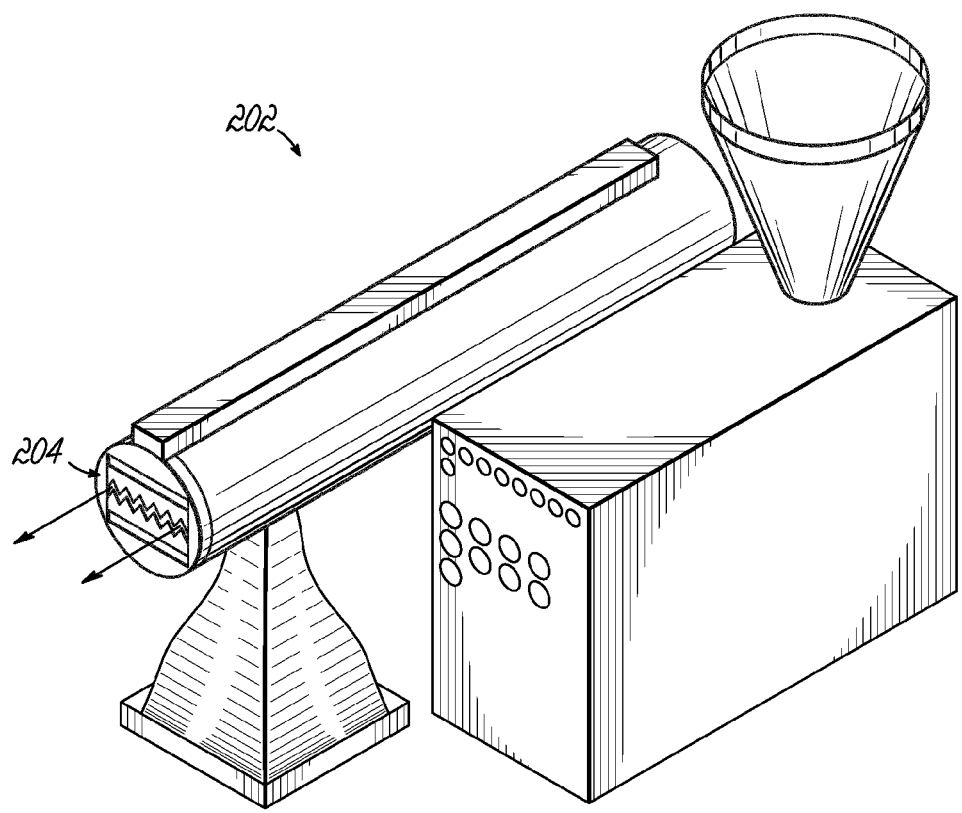
FIG. 11 is a perspective view of a web of material having a generally non-linear cross-section being extruded from an extruder head of alternate design.
Figure 15:
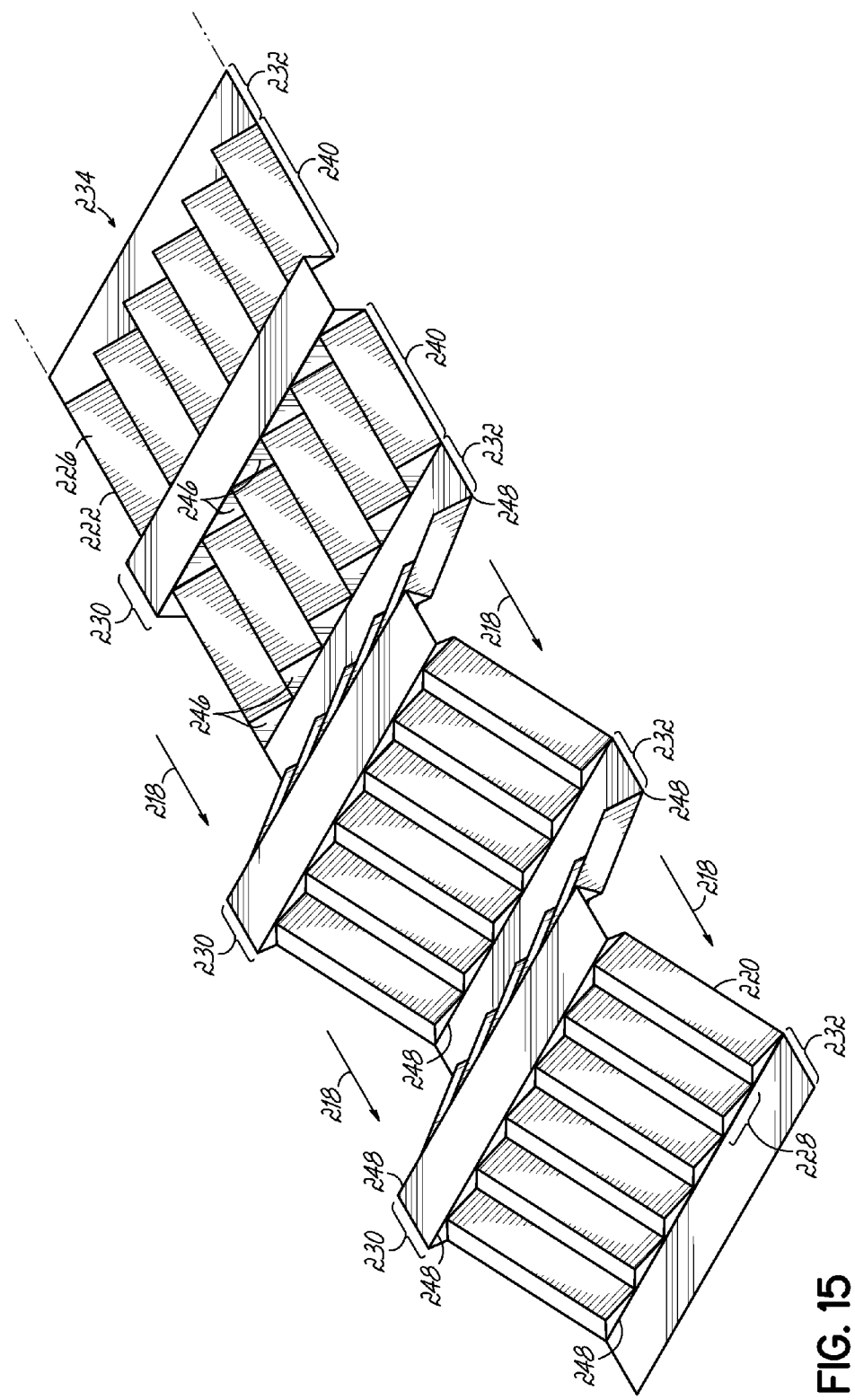
FIG. 15 is a perspective view of a portion of the treated web of FIG. 14 being folded to create rows of cells.
Figure 16:
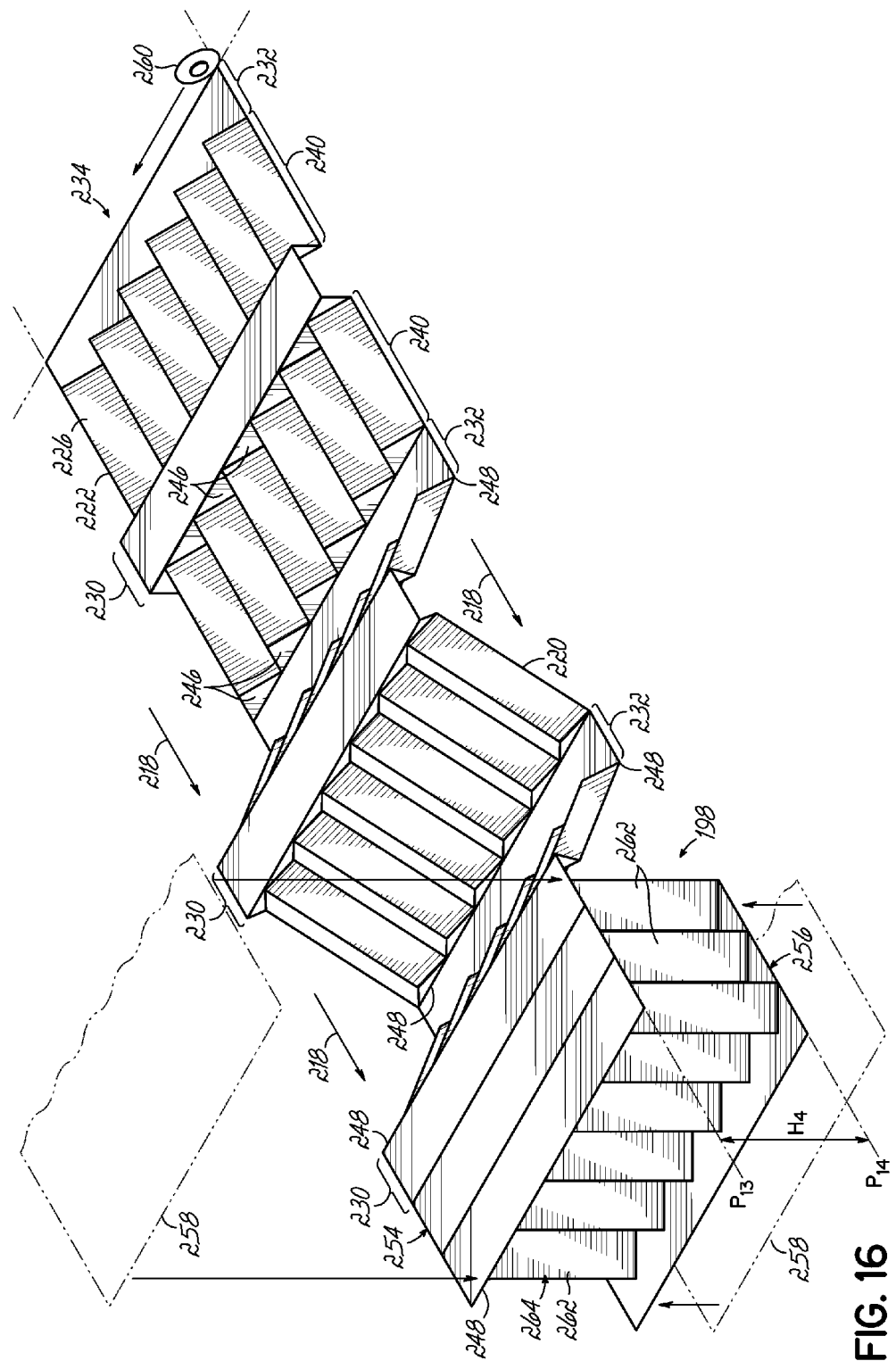
FIG. 16 is a perspective view of a portion of the treated web of FIG. 14 being further folded to create a portion of a core product.
Figure 17:
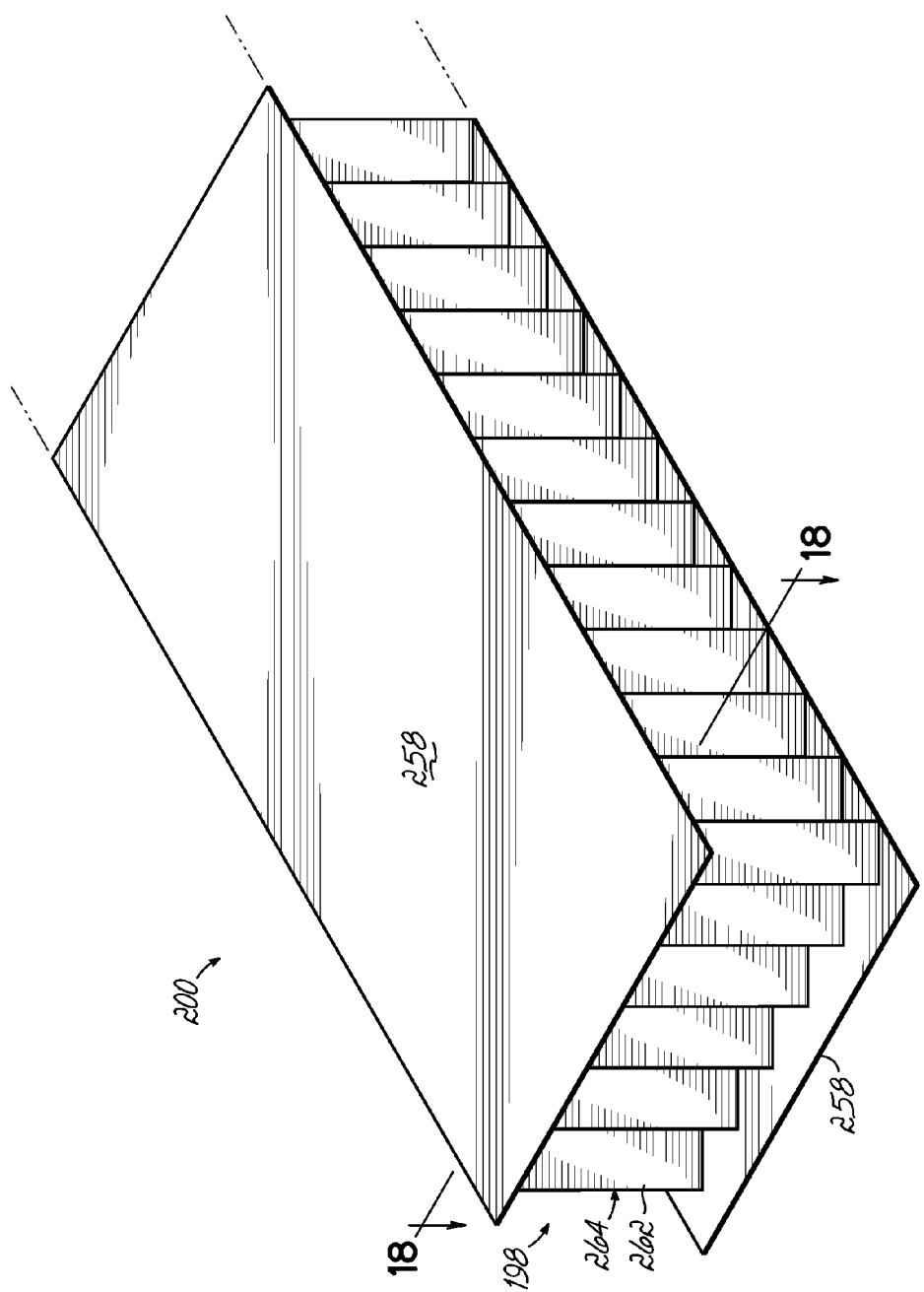
FIG. 17 is a perspective view of a finished core product.
Figure 18:
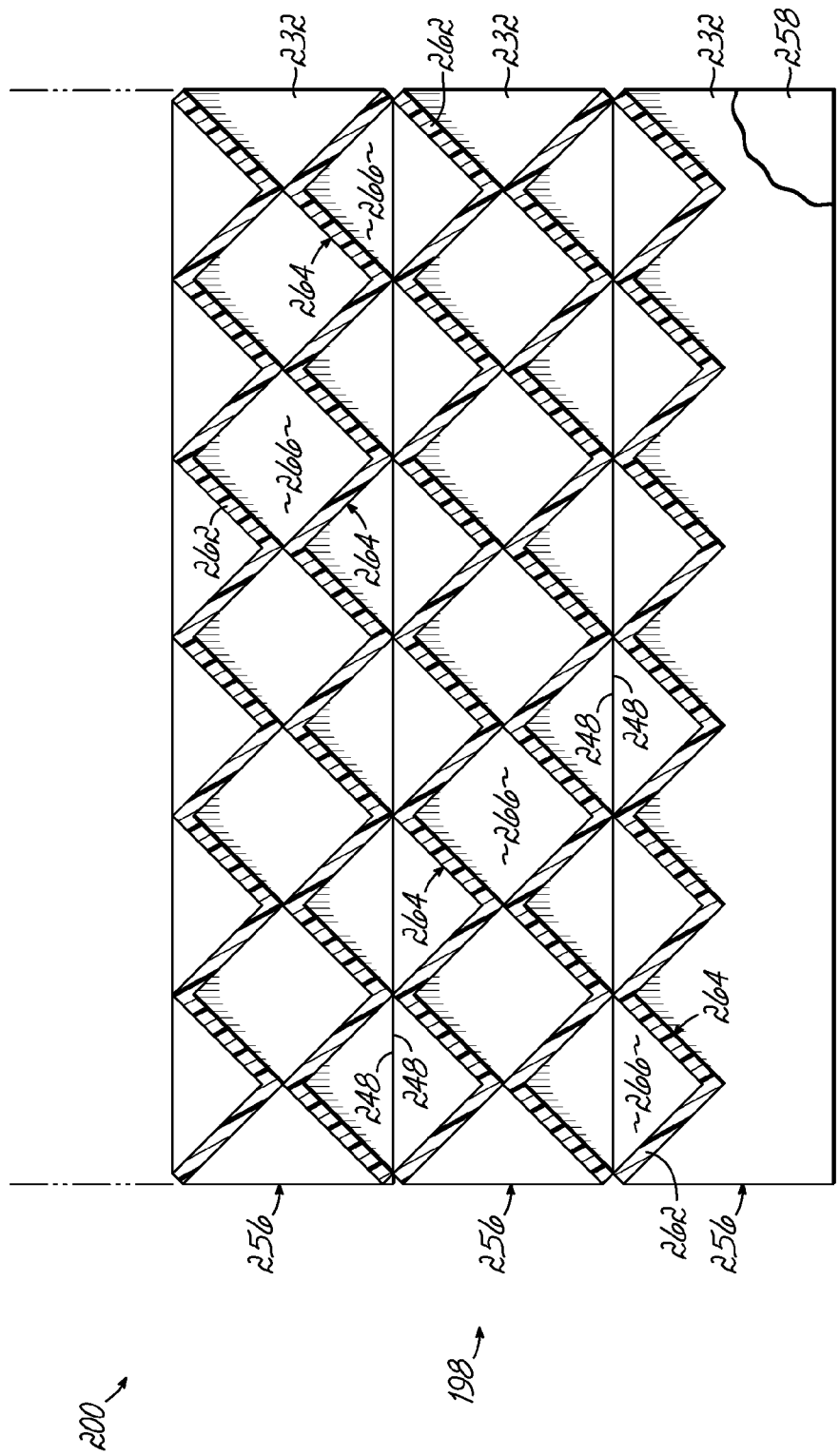
FIG. 18 is a cross-sectional view taken along the line 18-18 of FIG. 17.

FIGS. 11-19 illustrate a method or process of making a multi-layered or sandwich-like product 200, shown in FIGS. 17 and 18. The product 200 comprises upper and lower generally planar skins 258 secured to a middle core 198. FIG. 11 illustrates an extruder 202 having an extruder head 204 shown in more detail in FIG. 11A.

Figure 11A:
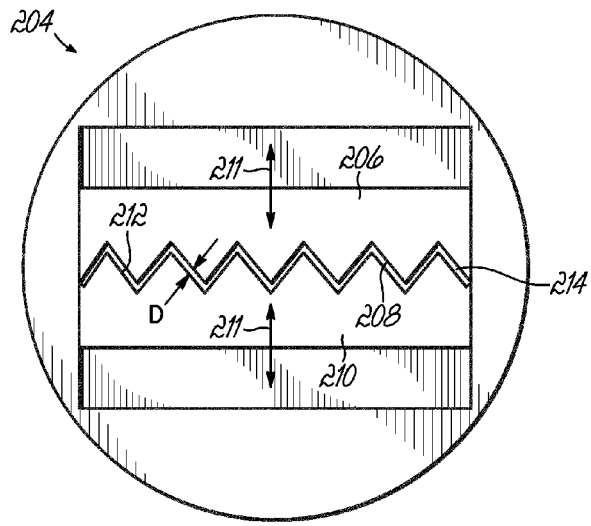
FIG. 11A is an enlarged view of the extruder head of FIG. 11.

As best shown in FIG. 11A, the extruder head 204 comprises a movable first or upper piece 206 having a jagged or tooth-shaped lower edge 208 and a movable second or lower piece 210 having a jagged or tooth-shaped upper edge 212. Each piece 206, 210 may be independently movable relative to the other, as shown by arrows 211. A gap 214 between the lower edge 208 of the upper piece 206 and the upper edge 212 of the lower piece 210 defines the size of the extrudate or web of material 216 exiting the extruder head 204. In particular, the distance "D" between the lower edge 208 of the upper piece 206 and the upper edge 212 of the lower piece 210 defines the thickness "T" of the extrudate 216 exiting the extruder head 204. Although one configuration of extruder 202 is illustrated, any type or configuration of extruder known in the art may be used. The extruder and extruder head configurations will vary as a function of the material being extruded and the cross-section of the extrudate. The material can include any of a variety of plastic compositions and any other material capable of being extruded, and can encompass additional compositions which can be further processed to produce a sandwich-like product for packaging or other desired applications.

Figure 12:
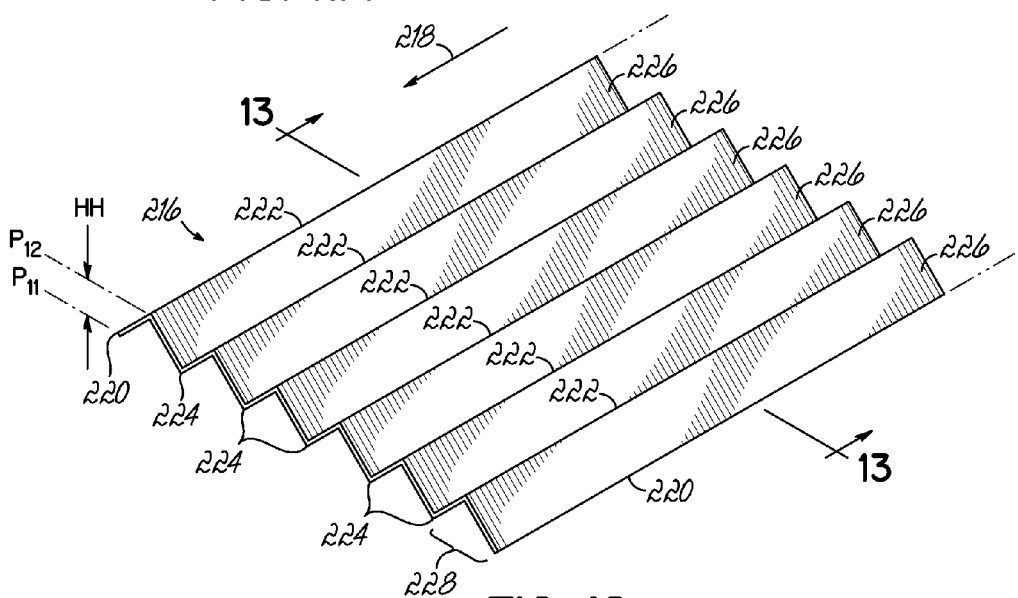
FIG. 12 is a perspective view of a portion of an extruded web made with the extruder head of FIG. 11.

As shown in FIG. 12, the extruded web 216 travels in a direction indicated by arrow 218. The extruded web 216 has a pair of opposed side edges 220, the linear distance between which defines the width or transverse dimension of the extruded web 216. The extruded web 216 may be any desired material of any desired shape, i.e., thickness and/or width.

Figure 13:
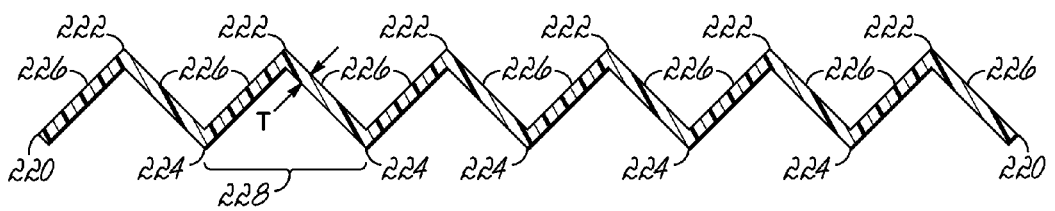
FIG. 13 is a cross-sectional view taken along the line 13-13 of FIG. 12.

The extruded web 216 has a generally non-planar profile or non-linear, cross-section or cross-sectional configuration. In cross-section, the extruded web 216 has a generally corrugated configuration or shape, including a plurality of peaks 222 and a plurality of valleys 224 joined together by connecting portions 226, all extending in the direction of travel of the web shown by arrows 218 during the extrusion process. Each of the peaks 222, valleys 224 and connecting portions 226 is longitudinally extending, as shown in FIG. 12, extending parallel the outer edges 220 of the extruded web 216. The valleys 224 are all generally co-planar in a horizontal plane $P_{11}$. Likewise, the peaks 222 are all generally co-planar in a horizontal plane $P_{12}$ above the plane $P_{11}$. The linear distance between the planes $P_{11}$ and $P_{12}$ defines the height "HH" of the corrugations 228. Although one shape or configuration of extruded web 216 is illustrated in FIGS. 12 and 13, the extruded web 216 may assume numerous other non-linear configurations in cross-section, such as those shown in FIGS. 13A, 13C, 13E and 13G.

Figure 14:
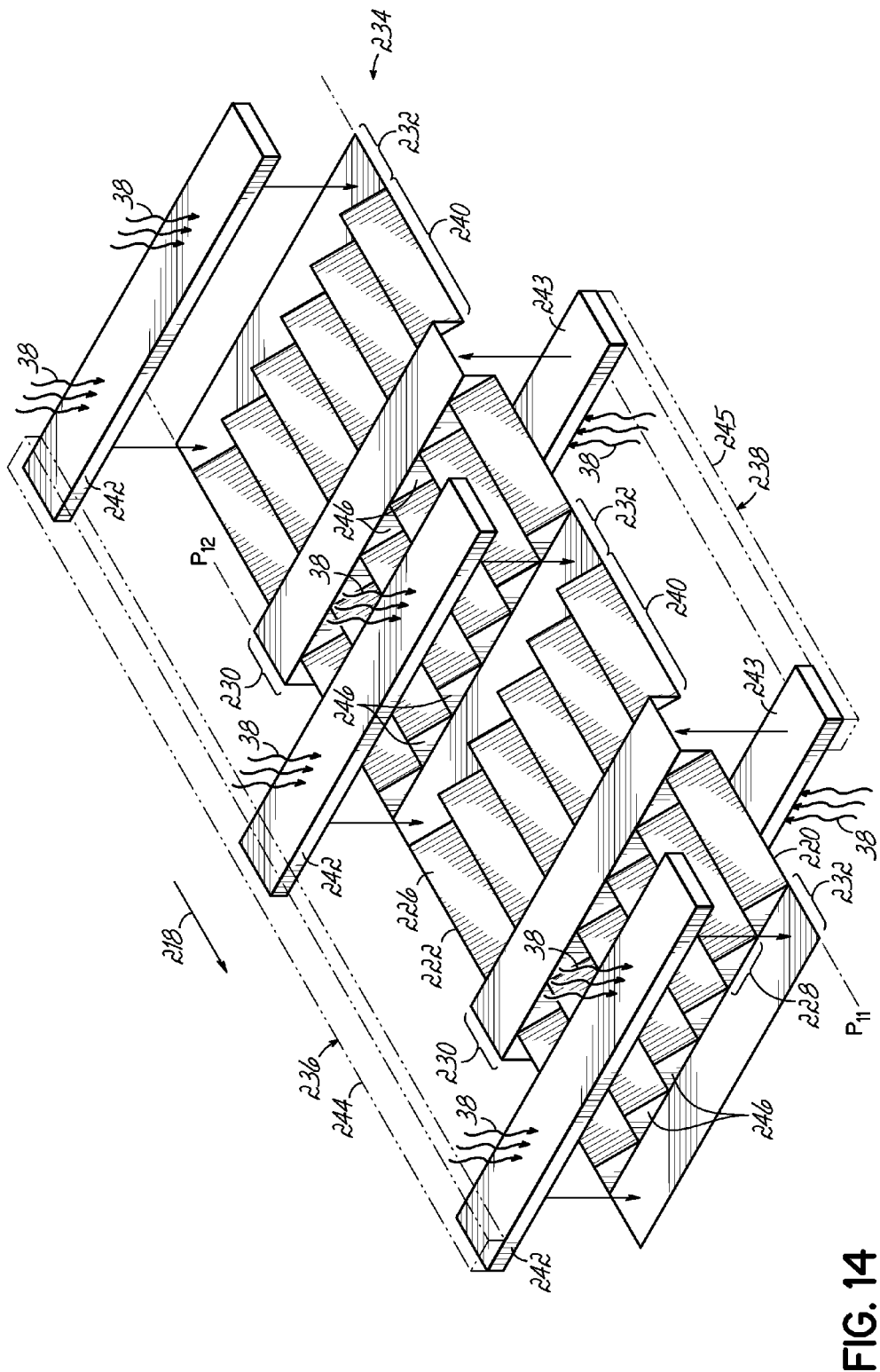
FIG. 14 is a perspective view of a portion of the extruded web of FIG. 12 being treated to create transversely extending flats.

FIGS. 14 and 15 illustrate part of the process of making the core 198 of the sandwich-like product 200 shown in FIG. 17. This part of the process comprises plastically deforming or flattening at least selected portions or areas 230, 232 of the extruded web 216 to create a plastically deformed or treated extruded web 234 shown being folded in FIG. 15. This plastic deformation may include using movable tools 236, 238, such as those shown in FIG. 14, to interrupt the continuous corrugations 228 formed in the extruded web 216 and create a plurality of corrugated regions or areas 240 between adjacent flattened areas 230, 232. Each corrugated region 240 comprises a plurality of corrugations 228 extending in a first direction generally parallel the direction of travel 218 of the extruded web 162 or longitudinally, and a plurality of flats or flattened areas 230, 232 each extending in a second direction perpendicular to the first direction, transversely or from side-to-side. The size of these regions or areas 230, 232 and 240 may vary depending upon the desired size or shape of the cells of the core 198.

Although upper tool 236 is illustrated as comprising three parallel bars 242 joined together with connectors 244 (only one being shown for clarity), and lower tool 238 is illustrated as comprising two bars 243 joined together with connectors 245 (only one being shown for clarity), respectively, these tools may comprise any number of bars of any desired size or configuration joined together with any number of connectors or not. Although two tools are illustrated, any number of tools of any desired type or configuration may be used. Again, the term tool is not intended to be limiting and may include any tool known in the art.

During the step of plastically deforming or flattening at least selected portions 230, 232 of the extruded web 216, the bars 242, 243 of the tools 236, 238 may be chilled, at ambient temperature, or heated by any desired method to facilitate processing. Such heating is illustrated schematically by arrows 38. This heating step is optional and may be used in desired applications only. In other applications, it may be omitted partially or entirely. Although it is shown schematically after the flats 230, 232 have been created in the extruded web 216, this heating step may occur any time during this manufacturing process.

Due to the creation of the flattened areas or flats 230, 232, each corrugation 228 may have end portions 246, each end portion 246 extending between a peak 222 and a valley 224. These end portions 246 are illustrated as each being in the shape of a triangle, but may be other shapes, depending upon the shape of the corrugations.

As best illustrated in FIGS. 14 and 15, each generally rectangular, transversely extending flat or flattened area 232 is located in the lower plane $P_{11}$ of the extruded web 216. Each generally rectangular, transversely extending flat or flattened area 230 is located in upper plane $P_{12}$ above the lower plane $P_{11}$ of the extruded web 216 and co-planar with the plane of the peaks 222 of corrugations 228. Flattened areas 232 and 230 alternate between corrugated regions 240. In other words, one flat 232 and one flat 230 are on opposite sides of a corrugated region 240.

As shown in FIG. 15, after the extruded web 216 is treated or plastically deformed to create treated extruded web 234, treated extruded web 234 is then folded along transversely extending fold lines 248 located generally on the edges of the flats 230, 232. Such fold lines 248 may be optionally scored or perforated at any step in the manufacturing process with cuts to assist folding. Such scoring may be made by a separate tool or tools.

Figure 19:
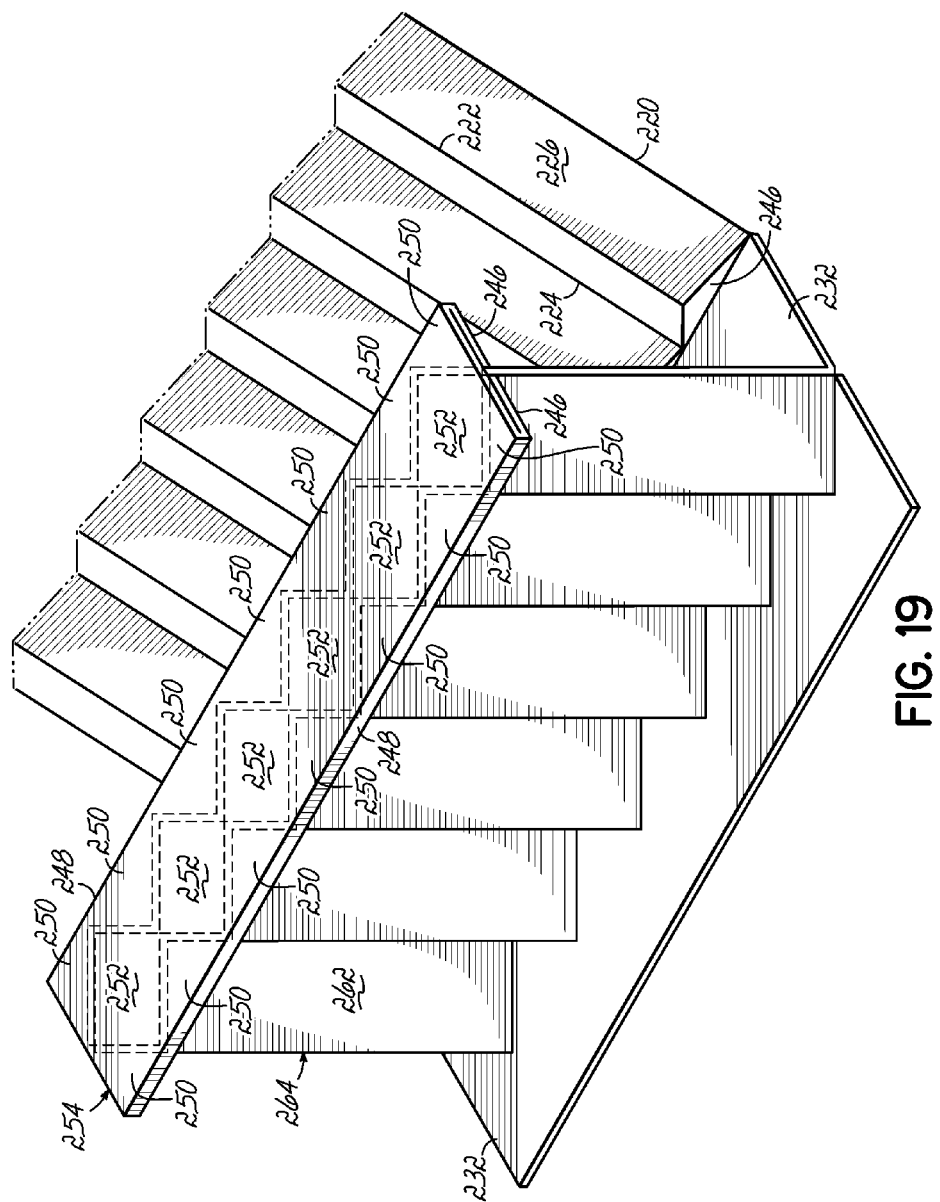
FIG. 19 is an enlarged view of a portion of the treated and folded web of FIG. 16.

As shown in FIG. 16, after the plastically deformed web 234 is folded along transversely extending fold lines 248, end portions 246 lie underneath and may contact the raised flat 230, and end portions 246 of corrugations 228 rest on and contact lower flats 232. In other words, as shown in FIG. 19, the triangular portions 250 of the upper horizontal portions 254 of core 198 are two plies thick, the lower ply being the end portions 246 of corrugations 228 before the treated web 234 is folded along fold lines 248. The remainder of the upper flat 230 comprises single-ply diamond-shaped areas 252. The same is true on the lower horizontal portions 256 of core 198.

As shown in FIG. 16, as the treated web 234 is folded along fold lines 248, an upper skin 258 is secured to the upper horizontal portions 254 of core 198, and a lower skin 258 is secured to the lower horizontal portions 256 of core 198. This step may occur separately or simultaneously with the folding step described above. As shown in FIG. 16, the upper horizontal portions 254 of core 198 are located generally in a horizontal plane $P_{13}$, and the lower horizontal portions 256 of core 198 are located generally in a horizontal plane $P_{14}$. The linear distance between horizontal planes $P_{13}$ and $P_{14}$ comprises the height "$H_4$" of the core 198.

The last step in the process is to cut the treated web 234 at any desired location. FIG. 16 illustrates a movable cutter 260 at one location. However, one or more cutting tools or devices may be used at any desired location to cut the treated web 234.

As shown in FIG. 18, after the treated web 234 is folded along fold lines 248, the connecting portions 226 of the corrugations 228 of the corrugated regions 240 become side walls 262 of the cells 264 of the core 198. Peaks 222 of the corrugations 228 of one of the corrugated regions 240, shown in FIG. 15, contact peaks 222 of the corrugations 228 of an adjacent corrugated region 240 after the treated web 234 is folded. Similarly, valleys 224 of the corrugations 228 of one of the corrugated regions 240, shown in FIG. 15, contact valleys 224 of the corrugations 228 of an adjacent corrugated region 240 after the treated web 234 is folded.

As shown in FIG. 18, side walls 262, along with the flats 230, 232 of treated web 234, define a cell 264 having a cell interior 266 after the treated web 234 is folded and the skins 258 applied to the upper and lower horizontal portions 254, 256 of the folded web.

Figure 20:
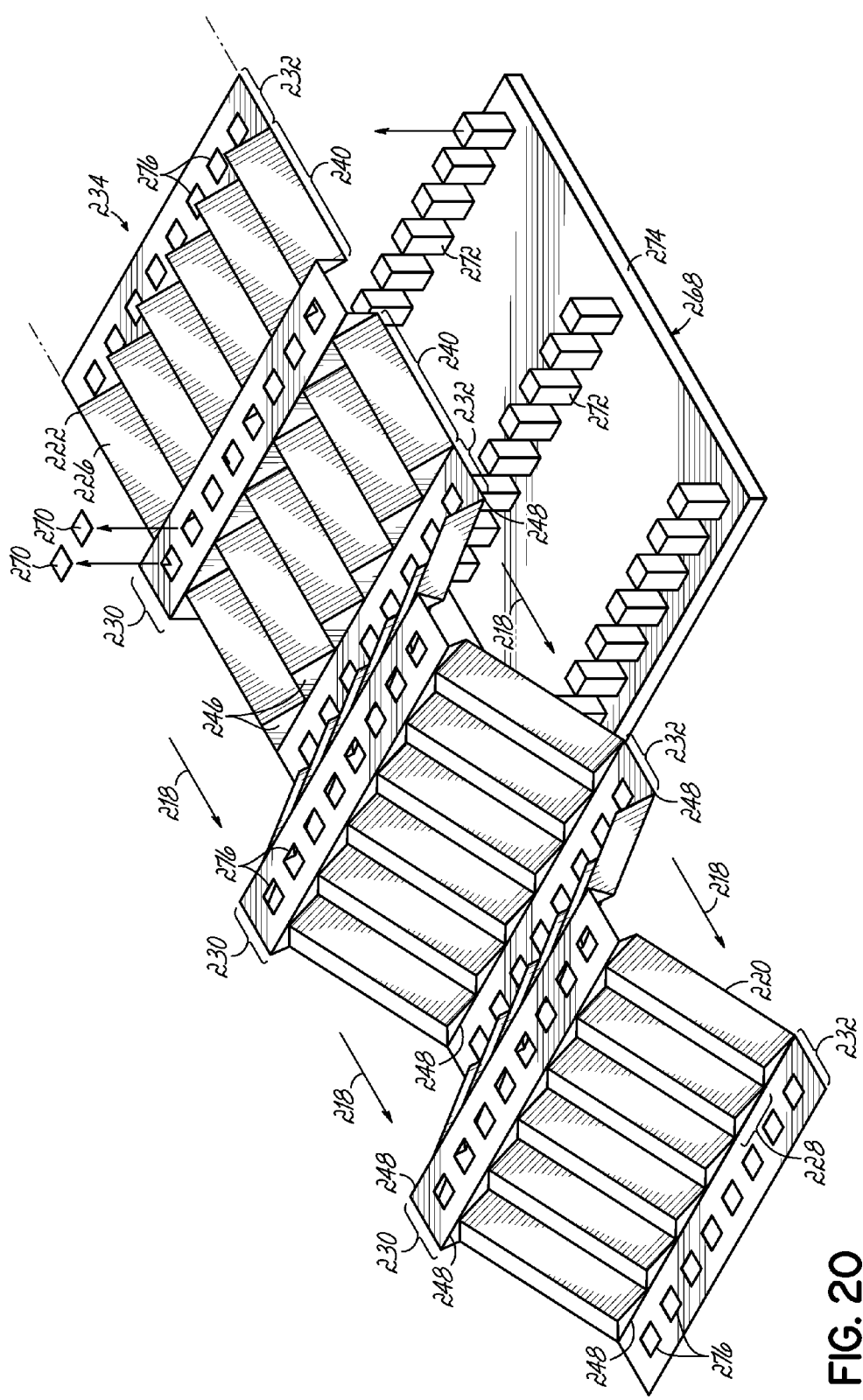
FIG. 20 is a perspective view of a portion of the treated web of FIG. 14 being treated to create a plurality of openings in the web.

FIG. 20 illustrates a movable tool 268 in the form of a punch press which is used to remove material 270 from treated web 234 in predetermined or preselected locations. In FIG. 20, the punch press or tool 268 has a plurality of punchers 272 mounted on a plate 274 at preselected or predetermined locations or positions to create a plurality of openings 276 through predetermined or preselected portions of the treated web 234. These openings 276 become the openings in a core, like the core 198 described above. Although illustrated as being rectangular, the openings 276 may be of any predefined desired size or shape. For example, the openings may be circular or oval-shaped. Similarly, although illustrated as being formed only in the flats 230, 232 of the treated web 234, the openings may be strategically located at any desired location or locations. For example, the openings may be located, such that each cell 264 has at least one opening through the top or bottom of the cell 264, allowing access to the interior 266 of the cell 264.

Although a punch press is illustrated, any other tool, such as a laser cutter, may be used to create openings through any portion of the treated web 234 to lighten the treated web 234 so that when treated web 234 is formed into a core 198, the resultant sandwich-like product 200 has a relatively high strength-to-weight ratio due, at least in part, to the removal of such material during the process of manufacturing the core 198.

Although the tool 268 is illustrated beneath the treated web 234, tool 268 may be located above the treated web 234, or at any desired location. More than one tool may be used if desired. The present invention does not intend to limit the tool or tools used to remove material in any of the embodiments described or shown herein.

As shown in FIG. 20, after the openings 276 have been bored, punched or otherwise made, the treated web 234 is then folded, as described above. Although not shown in FIG. 20, any of the extruded webs described or shown herein, including but not limited to extruded web 216, may be treated, such that openings are created therein using any method shown or described herein before being flattened or further treated or after the flats are formed therein.

Figure 21:
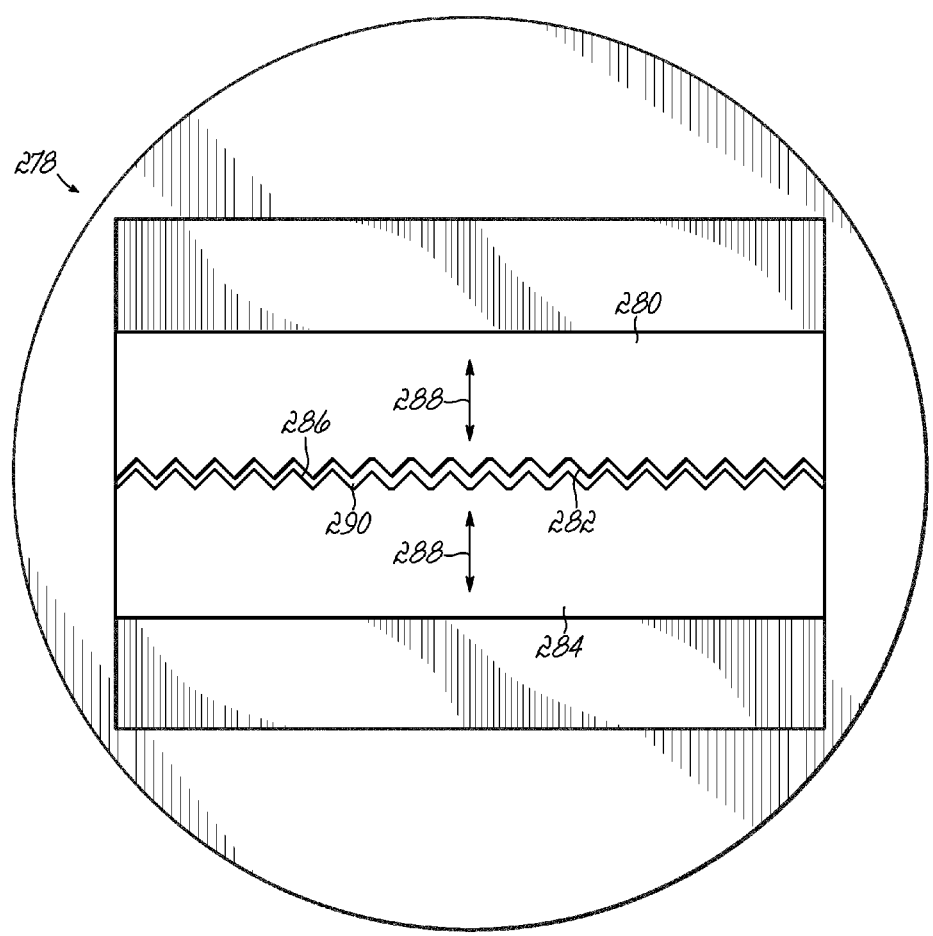
FIG. 21 is an enlarged view of another extruder head.
Figure 22:
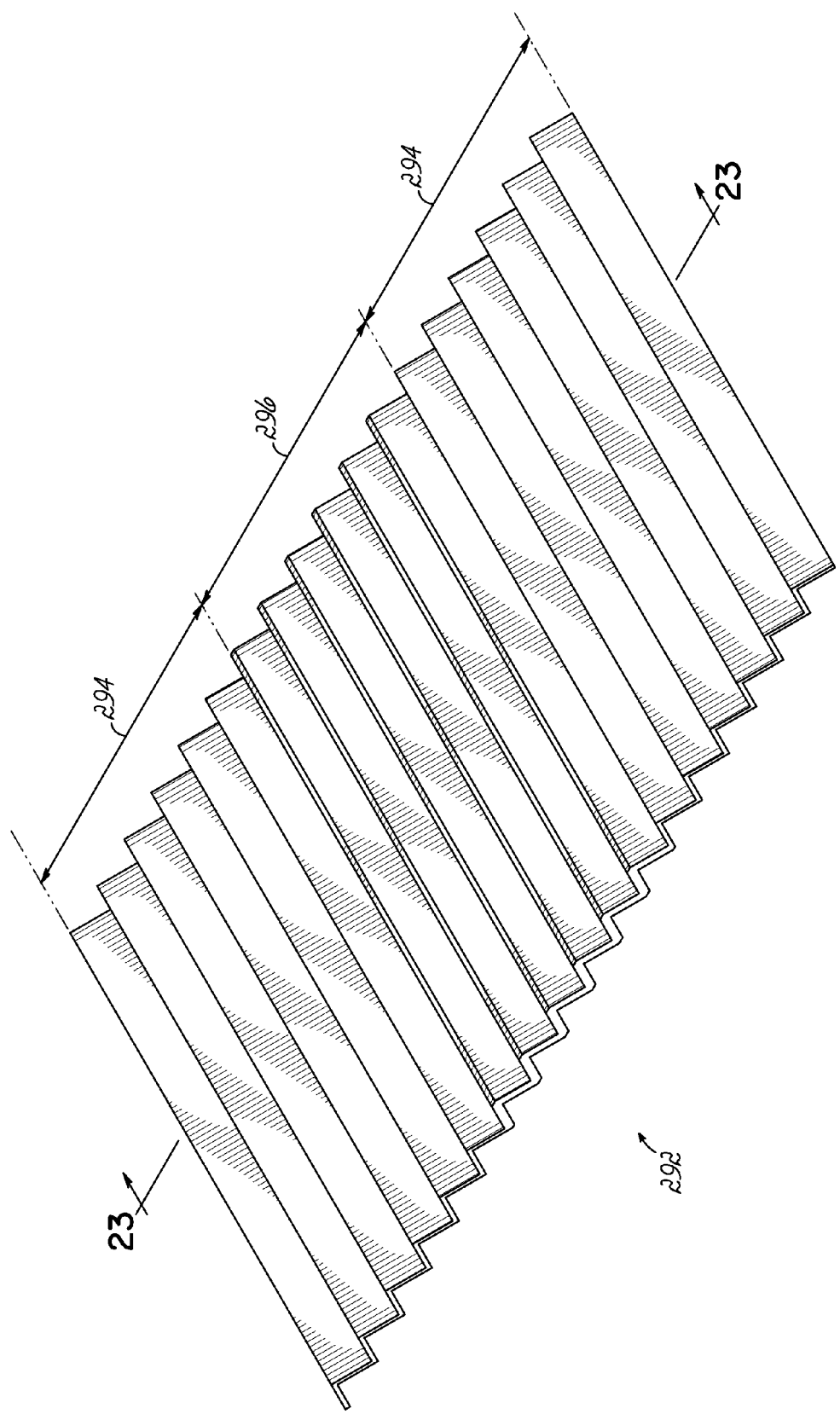
FIG. 22 is a perspective view of a portion of an extruded web made with the extruder head of FIG. 21.
Figure 23:
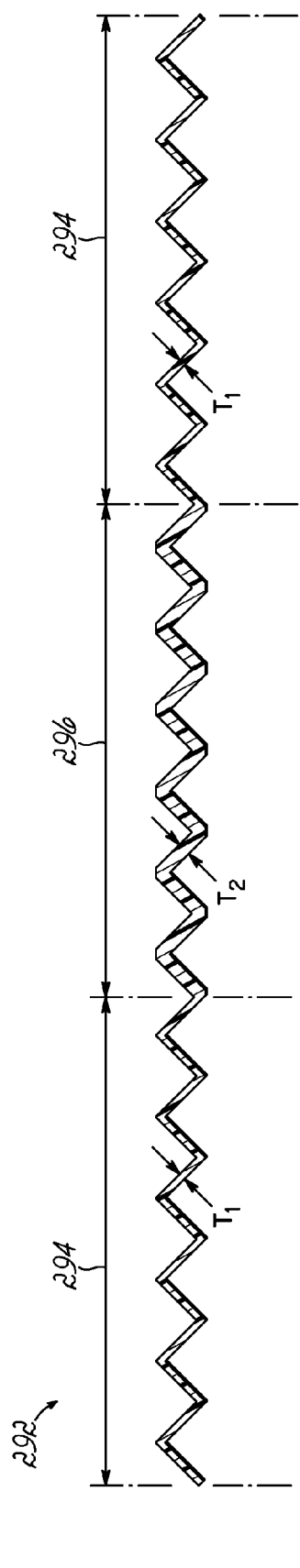
FIG. 23 is a cross-sectional view taken along the line 23-23 of FIG. 22.
Figure 25:
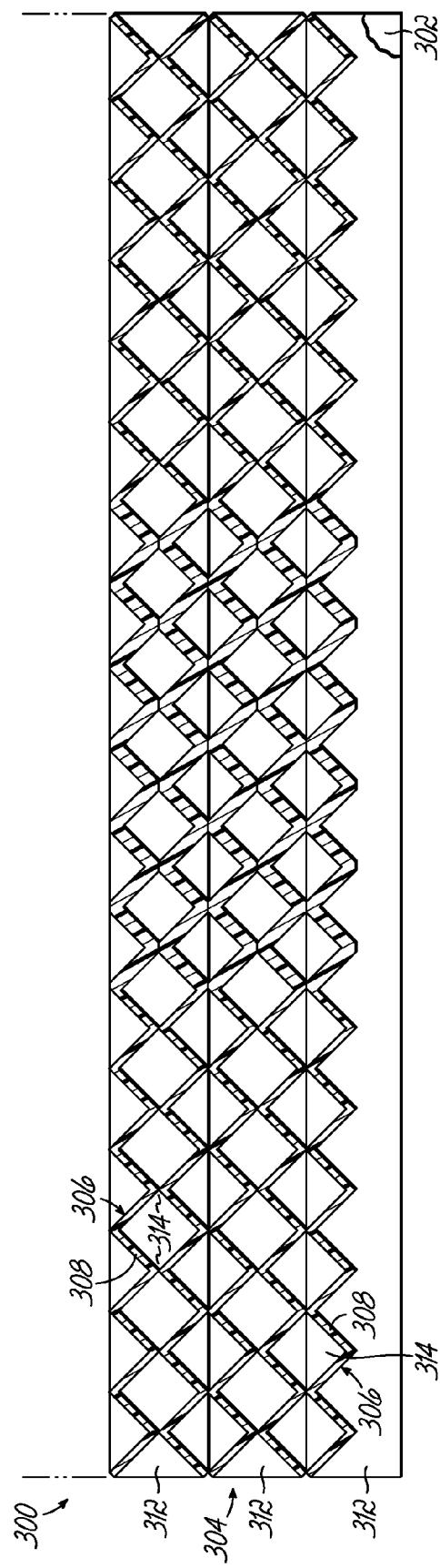
FIG. 25 is a cross-sectional view taken along the line 25-25 of FIG. 24.
Figure 24:
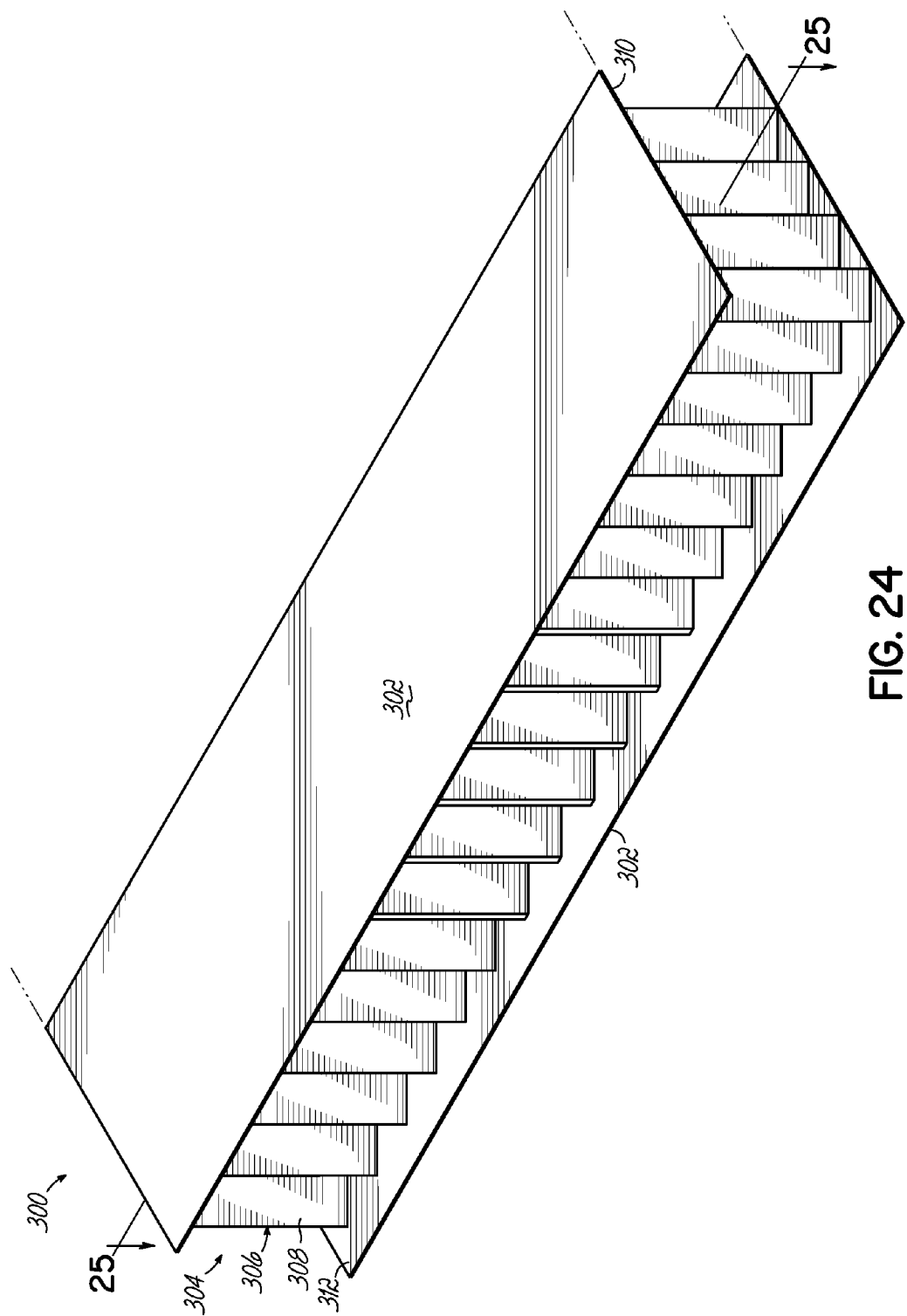
FIG. 24 is a perspective view of a finished core product.

FIGS. 21-25 illustrate a method or process of making another sandwich-like product having a central core. However, the core of this embodiment is posturized or has regions or areas having different characteristics. The multi-layered or sandwich-like product 300 is shown in FIGS. 24 and 25. The product 300 comprises upper and lower generally planar skins 302 secured to a middle core 304. FIG. 21 illustrates an extruder head 278 which may be used in any conventional extruder, including those shown and described herein.

As shown in FIG. 21, the extruder head 278 comprises a movable first or upper piece 280 having a jagged or tooth-shaped lower edge 282, and a movable second or lower piece 284 having a jagged or tooth-shaped upper edge 286. Each piece 280, 284 may be independently movable relative to the other, as shown by arrows 288. A gap 290 between the lower edge 282 of the upper piece 280 and the upper edge 286 of the lower piece 284 defines the size of the extrudate or web of material 292 exiting the gap 290 of extruder head 278. In particular, the distance between the lower edge 282 of the upper piece 280 and the upper edge 286 of the lower piece 284 defines the thickness of the extrudate 292 exiting the extruder head 278. In this embodiment, the thickness of the extrudate 292 is not uniform across the width of the extrudate 292, as shown in FIGS. 22 and 23 due to the configurations of the pieces 280, 284 of the extruder head 278. As shown in FIGS. 22 and 23, the extrudate 292 may be divided into three different regions, two outer regions 294 of a uniform thickness "$T_1$" and a middle region 296 of a uniform thickness "$T_2$", greater than the thickness "$T_1$" of the outer regions 294. After being flattened in certain areas and folded, the core 304 has the skins 302 applied and cut to size as described herein to create the finished sandwich-like product 300 shown in FIG. 24.

FIG. 25 illustrates a cross-section of the core 304 having a plurality of cells 306, each cell 306 comprising side walls 308, a top 310 and a bottom 312 defining a hollow interior 314. The interior 314 is diamond-shaped in cross-section, as seen in FIG. 25.

Figure 13A:
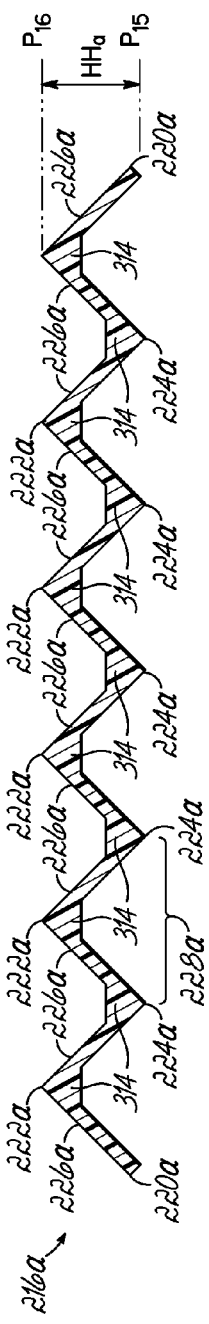
FIG. 13A is a cross-sectional view of an alternative extrusion.
Figure 13B:
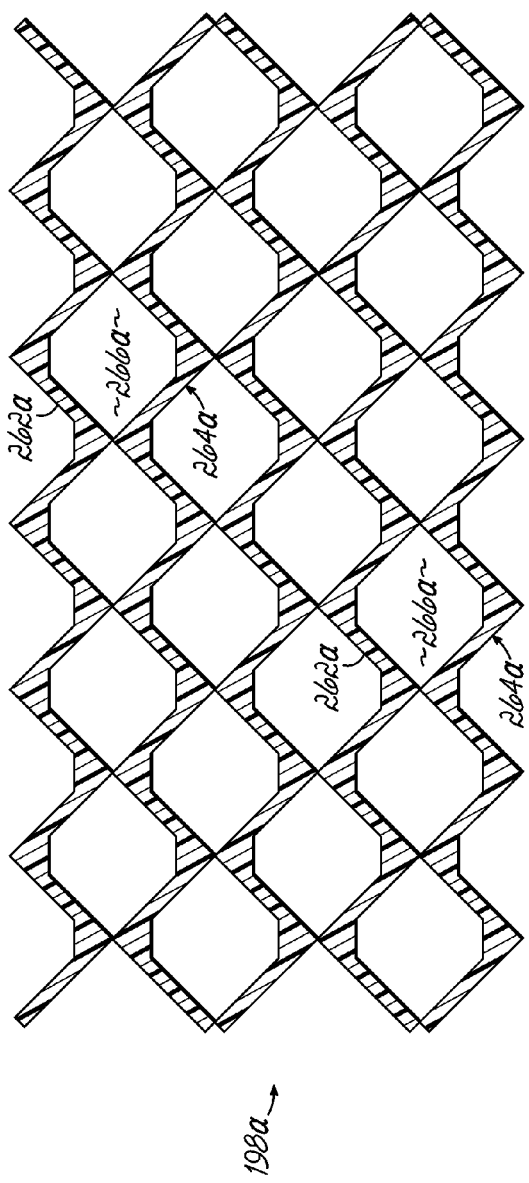
FIG. 13B is a cross-sectional view of a core made from the extrusion of FIG. 13A.

FIGS. 13A and 13B illustrate an alternative extrusion 216a. This extrusion 216a, shown in cross-section in FIG. 13A, has a generally non-planar profile or non-linear, cross-section. In cross-section, the extruded web 216a has a generally corrugated configuration or shape, including a plurality of peaks 222a and a plurality of valleys 224a joined together by connecting portions 226a, all extending in the direction of travel of the web during the extrusion process. Each of the peaks 222a, valleys 224a and connecting portions 226a is longitudinally extending, extending parallel the outer edges 220a of the extruded web 216a. The valleys 224a are all generally co-planar in a horizontal plane $P_{15}$. Likewise, the peaks 222a are all generally co-planar in a horizontal plane $P_{16}$ above the plane $P_{15}$. The linear distance between the planes $P_{15}$ and $P_{16}$ defines the height "$HH_a$" of the corrugations 228a. At the junction of intersecting connecting portions 226a, i.e., at each peak 222a and each valley 224a, additional material at locations 314 is extruded.

The additional material may cause the extrudate 216a to be stronger than if the additional material were omitted.

FIG. 13B illustrates in cross-section a core 198a made from the extrudate 216a, shown in FIG. 13A. As shown in FIG. 13B, after the extruded web 216a is partially flattened and folded along fold lines, the connecting portions 226a of the corrugations 228a of the corrugated regions become side walls 262a of the cells 264a of the core 198a. More particularly, the peaks 226a of the corrugations 228a of the corrugated regions shown in FIG. 13A contact valleys 224a of the corrugations 228a of the corrugated regions after the treated web is folded. As shown in FIG. 13B, side walls 262a along with the flats of treated web define a cell 264a having a cell interior 266a after the treated web is folded and the skins applied to the upper and lower horizontal portions of the folded web.

Figure 13C:
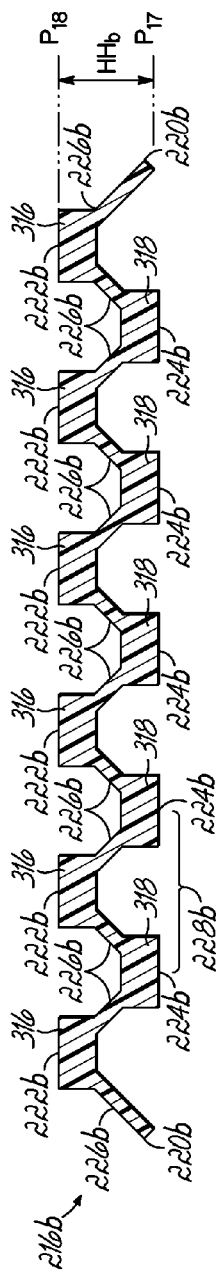
FIG. 13C is a cross-sectional view of an alternative extrusion.
Figure 13D:
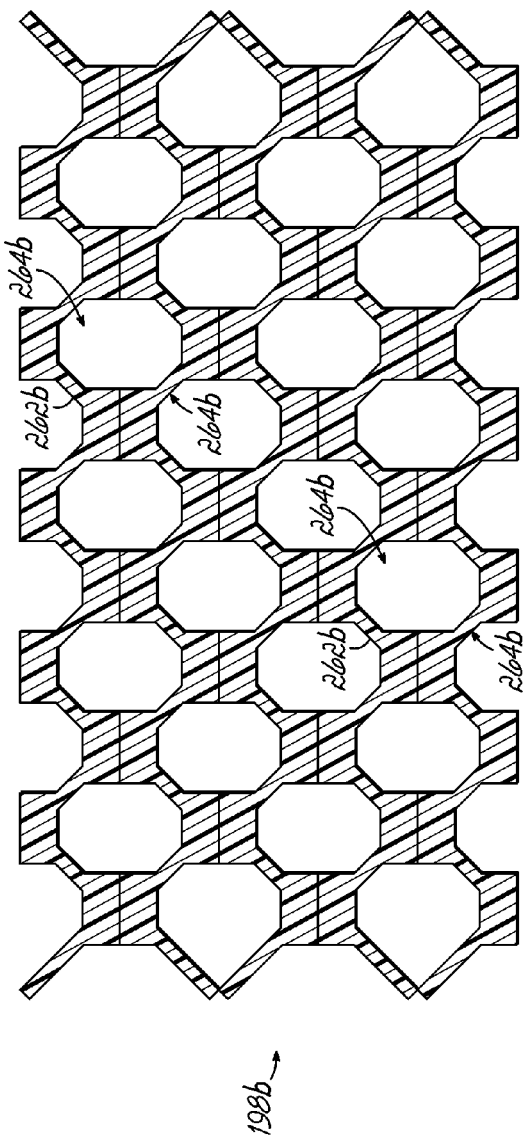
FIG. 13D is a cross-sectional view of a core made from the extrusion of FIG. 13C.

FIGS. 13C and 13D illustrate an alternative extrusion 216b. This extrusion 216b, shown in cross-section in FIG. 13C, has a generally non-planar profile or non-linear, cross-section. In cross-section, the extruded web 216b has a generally corrugated configuration or shape, including a plurality of peaks 222b and a plurality of valleys 224b joined together by connecting portions 226b, all extending in the direction of travel of the web during the extrusion process. Each of the peaks 222b, valleys 224b and connecting portions 226b is longitudinally extending, extending parallel the outer edges 220b of the extruded web 216b. The valleys 224b are all generally co-planar in a horizontal plane $P_{17}$. Likewise, the peaks 222b are all generally co-planar in a horizontal plane $P_{18}$ above the plane $P_{17}$. The linear distance between the planes $P_{17}$ and $P_{18}$ defines the height "$HH_b$" of the corrugations 228b. At each peak 222b and each valley 224b, additional material is extruded so that each peak 222b is generally rectangular in cross-section and has a flattened top 316. Similarly, each valley 224b is generally rectangular in cross-section and has a flattened bottom 318. The additional material may cause the extrudate 216b to be stronger than if the additional material were omitted.

FIG. 13D illustrates in cross-section a core 198b made from the extrudate 216b shown in FIG. 13C. As shown in FIG. 13D, after the extruded web 216b is partially flattened and folded along fold lines, the connecting portions 226b of the corrugations 228b of the corrugated regions become side walls 262b of the cells 264b of the core 198b. More particularly, the top surfaces 316 of peaks 226b of the corrugations 228b of the corrugated regions shown in FIG. 13D contact the flattened bottom surfaces of valleys 224b of the corrugations 228b of the corrugated regions after the treated web is folded. As shown in FIG. 13D, side walls 262b, along with the flats of treated web, define a cell 264b having a cell interior 266b after the treated web is folded and the skins applied to the upper and lower horizontal portions of the folded web.

Figure 13E:
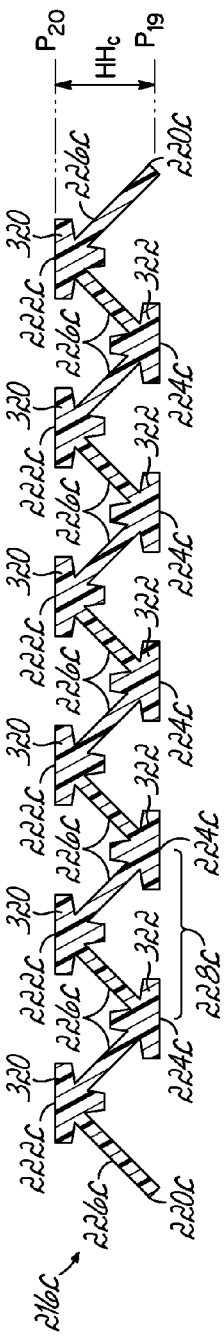
FIG. 13E is a cross-sectional view of an alternative extrusion.
Figure 13F:
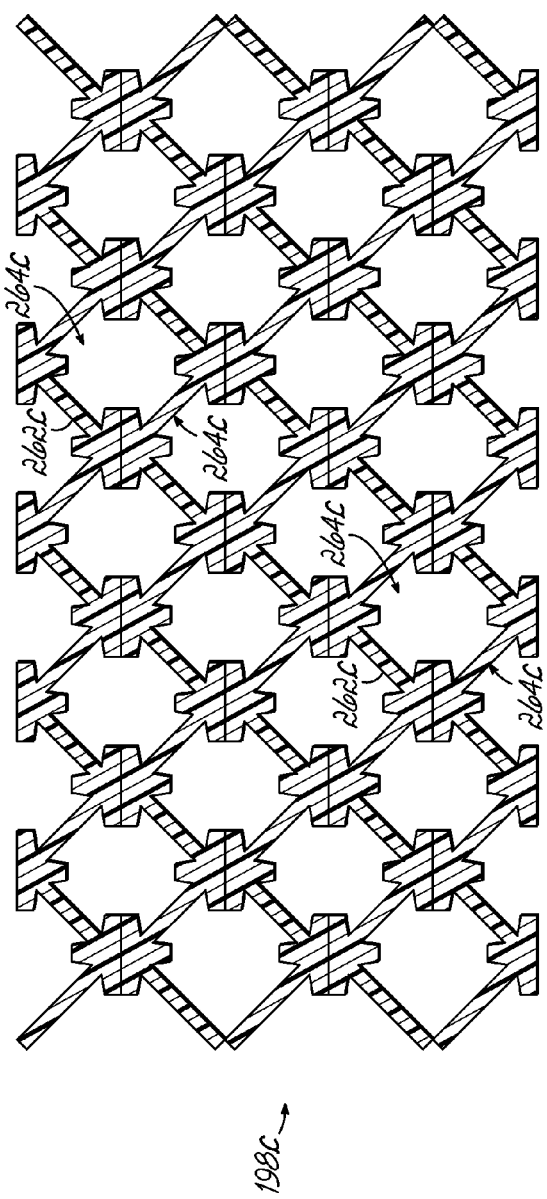
FIG. 13F is a cross-sectional view of a core made from the extrusion of FIG. 13E.

FIGS. 13E and 13F illustrate an alternative extrusion 216c. This extrusion 216c, shown in cross-section in FIG. 13D, has a generally non-planar profile or non-linear, cross-section. In cross-section, the extruded web 216c has a generally corrugated configuration or shape, including a plurality of peaks 222c and a plurality of valleys 224c joined together by connecting portions 226c, all extending in the direction of travel of the web during the extrusion process. Each of the peaks 222c, valleys 224c and connecting portions 226c is longitudinally extending, extending parallel the outer edges 220c of the extruded web 216c. The valleys 224c are all generally co-planar in a horizontal plane $P_{19}$. Likewise, the peaks 222c are all generally co-planar in a horizontal plane $P_{20}$ above the plane $P_{19}$. The linear distance between the planes $P_{19}$ and $P_{20}$ defines the height "$HH_c$" of the corrugations 228c. At each peak 222c and each valley 224c, additional material is extruded so that each peak 222c is generally rectangular in cross-section and has a flattened top 320. Similarly, each valley 224c is generally triangular in cross-section and has a flattened bottom 322. The additional material may cause the extrudate 216c to be stronger than if the additional material were omitted.

FIG. 13F illustrates in cross-section a core 198c made from the extrudate 216c shown in FIG. 13E. As shown in FIG. 13F, after the extruded web 216c is partially flattened and folded along fold lines, the connecting portions 226c of the corrugations 228c of the corrugated regions become side walls 262c of the cells 264c of the core 198c. More particularly, the top surfaces 320 of peaks 226c of the corrugations 228c of the corrugated regions shown in FIG. 13E contact the flattened bottom surfaces 322 of valleys 224c of the corrugations 228c of the corrugated regions after the treated web is folded. As shown in FIG. 13F, side walls 262c, along with the flats of treated web, define a cell 264c having a cell interior 266c after the treated web is folded and the skins applied to the upper and lower horizontal portions of the folded web.

Figure 13G:
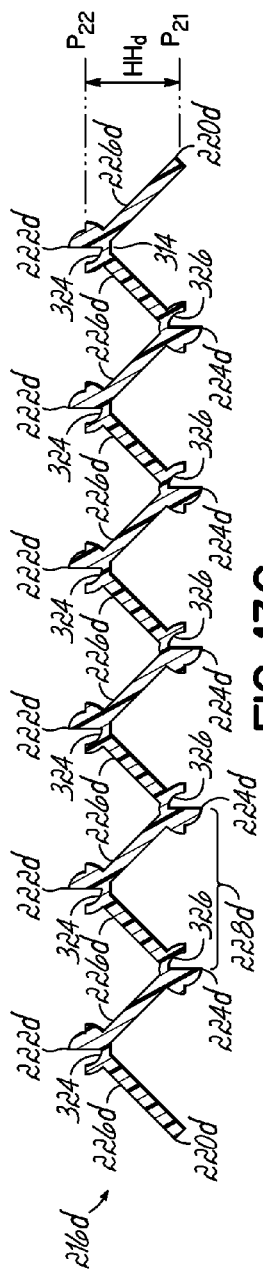
FIG. 13G is a cross-sectional view of an alternative extrusion.
Figure 13H:
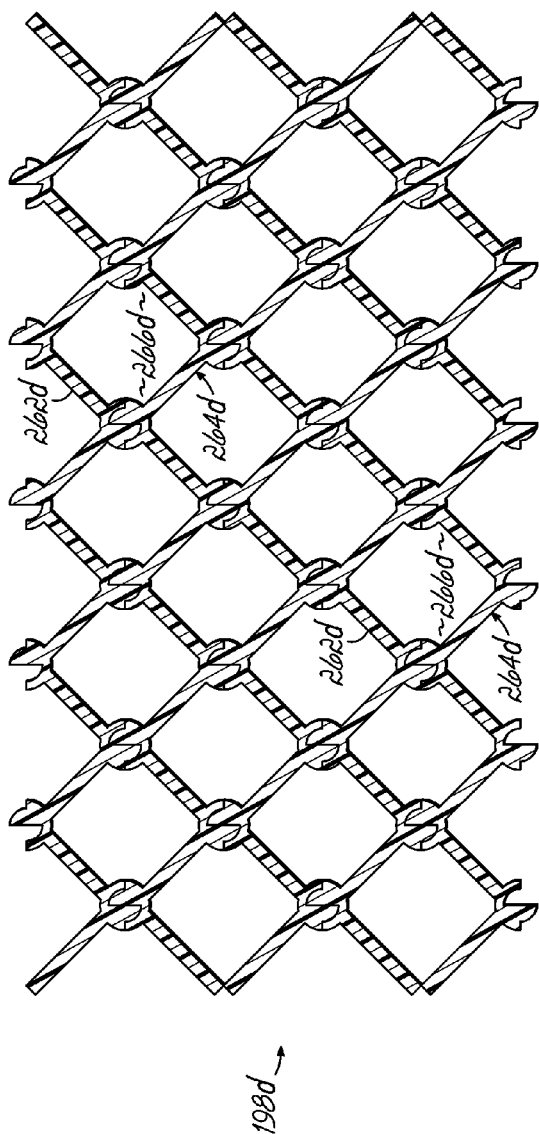
FIG. 13H is a cross-sectional view of a core made from the extrusion of FIG. 13G.

FIGS. 13G and 13H illustrate an alternative extrusion 216d. This extrusion 216d, shown in cross-section in FIG. 13G, has a generally non-planar profile or non-linear cross-section. In cross-section, the extruded web 216d has a generally corrugated configuration or shape, including a plurality of peaks 222d and a plurality of valleys 224d joined together by connecting portions 226d, all extending in the direction of travel of the web during the extrusion process. Each of the peaks 222d, valleys 224d and connecting portions 226d is longitudinally extending, extending parallel the outer edges 220d of the extruded web 216d. The valleys 224d are all generally co-planar in a horizontal plane $P_{21}$. Likewise, the peaks 222d are all generally co-planar in a horizontal plane $P_{22}$ above the plane $P_{21}$. The linear distance between the planes $P_{21}$ and $P_{22}$ defines the height "$HH_d$" of the corrugations 228d. At each peak 222d and each valley 224d, additional material is extruded so that each peak 222d has a recess 324. Similarly, each valley 224d has a recess 326 which mates with or abuts the recess 324 of a peak 222d when the extrudate is flattened and folded. The additional material and configuration of the peaks and valleys may cause the extrudate 216d to be stronger than if the additional material were omitted.

FIG. 13H illustrates in cross-section a core 198d made from the extrudate 216d shown in FIG. 13G. As shown in FIG. 13H, after the extruded web 216d is partially flattened and folded along fold lines, the connecting portions 226d of the corrugations 228d of the corrugated regions become side walls 262d of the cells 264d of the core 198d. More particularly, the inner surfaces 328 of peaks 226d of the corrugations 228c of the corrugated regions shown in FIG. 13G contact mating inner surfaces 330 of valleys 224d of the corrugations 228d of the corrugated regions after the treated web is folded. As shown in FIG. 13H, side walls 262d, along with the flats of treated web, define a cell 264d having a cell interior 266d after the treated web is folded and the skins applied to the upper and lower horizontal portions of the folded web.

While I have described several preferred embodiments of the present invention, persons skilled in the art will appreciate changes and modifications which may be made without departing from the spirit of the invention. For example, although one configuration of a cell is illustrated and described, the cells of the present invention may be other configurations, such as cylindrical in shape. Therefore, I intend to be limited only by the scope of the following claims and equivalents thereof.

I Claim:

1. A process of making a sandwich-like product, said process comprising:
    extruding a web of material having spaced parallel walls in first and second planes, respectively, and a plurality of spacers, each of the spacers extending between the walls and being spaced from each other so as to define a plurality of flutes, each of the flutes having a rectangular shape in cross-section;
    cutting portions of the extruded web using movable tools on opposite sides of the extruded web to create a plastically deformed web;
    folding the plastically deformed web along transversely extending fold lines located generally in the first and second planes to create a plurality of blocks, each of the blocks containing a row of cells to create a middle core;
    applying generally planar outer skins to tops and bottoms of the cells of the middle core to create a multi-layered web; and
    cutting the multi-layered web.

2. The process of claim 1 wherein adjacent blocks are joined to each other.

3. The process of claim 1 wherein adjacent blocks are adhesively joined to each other.

4. The process of claim 1 wherein at least one of the movable tools is heated.

5. The process of claim 1 wherein at least some of the fold lines are scored.

6. The process of claim 1 wherein each of the tools has multiple cutting members.

7. A process of making a sandwich-like product, said process comprising:
    extruding a plastic web of material having spaced walls in first and second planes, respectively, and a plurality of spacers, each of the spacers extending between the walls and being spaced from each other so as to define a plurality of flutes, each of the flutes being rectangular in cross-section;
    interrupting the flutes of the extruded web using movable tools on opposite sides of the extruded web to create a plastically deformed web;
    folding the plastically deformed web along transversely extending fold lines located generally in the first and second planes to create a plurality of blocks, each of the blocks containing a row of cells in a middle core;
    applying generally planar outer skins to tops and bottoms of the blocks of the middle core to create a multi-layered web; and
    cutting the multi-layered web.

8. The process of claim 7 further comprising forming a plurality of openings in the extruded web.

9. The process of claim 7 wherein adjacent blocks are joined to each other.

10. The process of claim 7 wherein adjacent blocks are joined to each other with adhesive.

11. The process of claim 7 wherein at least one of the movable tools is heated.

12. The process of claim 7 wherein at least some of the fold lines are scored.

13. The process of claim 7 wherein each of the tools has multiple cutting members.

14. A process of making a sandwich-like product, said process comprising:
    extruding a web of material having spaced walls in first and second planes, respectively, and a plurality of spacers, each of the spacers extending between the walls and being spaced from each other so as to define a plurality of continuous flutes, each of the continuous flutes having a rectangular shape in cross-section;
    interrupting the continuous flutes of the extruded web using movable tools on opposite sides of the extruded web to create a plastically deformed web;
    folding the plastically deformed web along non-perforated fold lines located alternatively in the first and second planes to create a plurality of blocks, each of the blocks containing a row of a cells to create a middle core;
    applying generally planar outer skins to the cells of the middle core to create a multi-layered web; and
    cutting the multi-layered web.

15. The process of claim 14 further comprising forming a plurality of openings in the extruded web.

16. The process of claim 14 wherein adjacent blocks are joined to each other.

17. The process of claim 14 wherein adjacent blocks are adhesively joined to each other.

18. The process of claim 14 wherein at least one of the movable tools is heated.

19. The process of claim 14 wherein all of the fold lines are scored.

20. The process of claim 14 wherein each of the tools has multiple deforming members.

21. A process of making a sandwich-like product, said process comprising:
    extruding a web of material having spaced parallel walls in first and second planes, respectively, and a plurality of spacers, each of the spacers extending between the walls and being spaced from each other so as to define a plurality of flutes, each of the flutes having a rectangular shape in cross-section;
    cutting portions of the extruded web using at least one movable tool to create a plastically deformed web;
    folding the plastically deformed web along transversely extending fold lines located generally in the first and second planes to create a plurality of blocks, each of the blocks containing a row of cells to create a middle core;
    applying generally planar outer skins to tops and bottoms of the cells of the middle core to create a multi-layered web; and
    cutting the multi-layered web.

22. The process of claim 21 wherein adjacent blocks are joined to each other.

23. The process of claim 21 wherein adjacent blocks are adhesively joined to each other.

24. The process of claim 21 wherein at least some of the fold lines are scored.

* * * * *

UNITED STATES PATENT AND TRADEMARK OFFICE
CERTIFICATE OF CORRECTION

| | |
|---|---|
| PATENT NO. | : 9,550,336 B2 |
| APPLICATION NO. | : 14/179168 |
| DATED | : January 24, 2017 |
| INVENTOR(S) | : Judson A. Bradford |

It is certified that error appears in the above-identified patent and that said Letters Patent is hereby corrected as shown below:

In the Specification

Column 2
Line 34, delete the "," after the word "non-linear".

Column 3
Line 41, delete the "," after the word "non-planar".
Line 44, delete the "," after the word "non-linear".
Line 47, delete the "," after the word "non-linear".

Column 5
Line 34, "P1" should be ---$P_1$---.
Line 35, "P2" should be ---$P_2$---.

Column 6
Line 10, "P1" should be ---$P_1$---.
Line 13, "P2" should be ---$P_2$---.
Line 50, "P3" should be ---$P_3$---.
Line 52, "P4" should be ---$P_4$---.
Line 52, "P3" should be ---$P_3$---.
Line 53, "P3" should be ---$P_3$---.
Line 53, "P4" should be ---$P_4$---.
Line 53, "H1" should be ---$H_1$---.

Column 7
Line 41, "P3" should be ---$P_3$---.
Line 43, "P4" should be ---$P_4$---.
Line 43, "P3" should be ---$P_3$---.

Signed and Sealed this
Eleventh Day of April, 2017

Michelle K. Lee
*Director of the United States Patent and Trademark Office*

Column 8
Line 44, "P6" should be ---$P_6$---.
Line 45, "P5" should be ---$P_5$---.
Line 53, "P5" should be ---$P_5$---.
Line 55, "P6" should be ---$P_6$---.
Line 55, "P5" should be ---$P_5$---.

Column 12
Line 11, delete the "," after the word "non-linear".
Line 19, "P7" should be ---$P_7$---.
Line 19, "P8" should be ---$P_8$---.
Line 21, "H2" should be ---$H_2$---.
Line 23, "W2" should be ---$W_2$---.

Column 13
Line 18, "P7" should be ---$P_7$---.
Line 18, "P8" should be ---$P_8$---.
Line 39, "P7" should be ---$P_7$---.
Line 39, "P8" should be ---$P_8$---.

Column 14
Line 20, "P8" should be ---$P_8$---.
Line 22, "P7" should be ---$P_7$---.
Line 22, "P8" should be ---$P_8$---.
Line 28, "P7" should be ---$P_7$---.
Line 28, "P8" should be ---$P_8$---.
Line 44, "P7" should be ---$P_7$---.
Line 44, "P8" should be ---$P_8$---.
Line 56, delete the "," after the word "non-linear".
Line 59, delete the "," after the word "non-linear".
Line 61, delete the "," after the word "non-linear".
Line 63, "P9" should be ---$P_9$---.
Line 63, "P10" should be ---$P_{10}$---.
Line 64, "H3" should be ---$H_3$---.
Line 67, "W3" should be ---$W_3$---.

Column 15
Line 45, delete the "," after the word "non-linear".

Column 18
Line 52, delete the "," after the word "non-linear".

Column 19
Line 19, delete the "," after the word "non-linear".
Line 56, delete the "," after the word "non-linear".

CERTIFICATE OF CORRECTION (continued)
U.S. Pat. No. 9,550,336 B2

In the Claims

<u>Column 22</u>
Line 19, delete the word "a" before the word "cells".